United States Patent
Seo

(10) Patent No.: US 7,400,824 B2
(45) Date of Patent: Jul. 15, 2008

(54) ANTI-SHAKE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 392 days.

(21) Appl. No.: 11/229,673

(22) Filed: Sep. 20, 2005

(65) Prior Publication Data

US 2006/0067660 A1    Mar. 30, 2006

(30) Foreign Application Priority Data

Sep. 24, 2004    (JP)    ............... P2004-277362

(51) Int. Cl.
*G03B 17/00*    (2006.01)
*H04N 5/228*    (2006.01)

(52) U.S. Cl. ................. 396/55; 396/52; 348/208.99

(58) Field of Classification Search ............ 348/208.99, 348/208.1, 208.2, 208.4; 396/52, 55
See application file for complete search history.

(56) References Cited

U.S. PATENT DOCUMENTS 6,035,131 A    3/2000    Washisu
7,224,893 B2*    5/2007    Uenaka ................ 396/55
2006/0133786 A1*    6/2006    Teramoto ............... 396/55

FOREIGN PATENT DOCUMENTS

JP    6399680    4/1988
JP    2003-91028    3/2003

OTHER PUBLICATIONS

English Language Abstract of JP-2003-91028.
U.S. Appl. No. 11/115,315, filed Apr. 27, 2005.
U.S. Appl. No. 11/140,731, filed Jun. 1, 2005.
U.S. Appl. No. 11/140,966, filed Jun. 1, 2005.
U.S. Appl. No. 11/229,648, filed Sep. 20, 2005.

* cited by examiner

*Primary Examiner*—Rodney E Fuller
(74) *Attorney, Agent, or Firm*—Greenblum & Bernstein, P.L.C.

(57) ABSTRACT

An anti-shake apparatus includes a movable unit supported by a fixed unit and movable in first and second directions as well as rotated on a movable plane. A first and second driving unit supply driving forces to the movable unit in a first direction. A third and fourth driving unit supply driving forces to the movable unit in a second direction. A first detector detects a direction of a gravitational force acting on the movable unit. A second detector detects a rotational movement around a straight line perpendicular to the movable plane. A control unit controls the third and fourth driving forces to correct the rotational movement when the gravitational direction is parallel to the first direction. The control unit controls the first and second driving forces to correct the rotational movement when the gravitational direction is parallel to the second direction.

9 Claims, 19 Drawing Sheets

Fig. 4
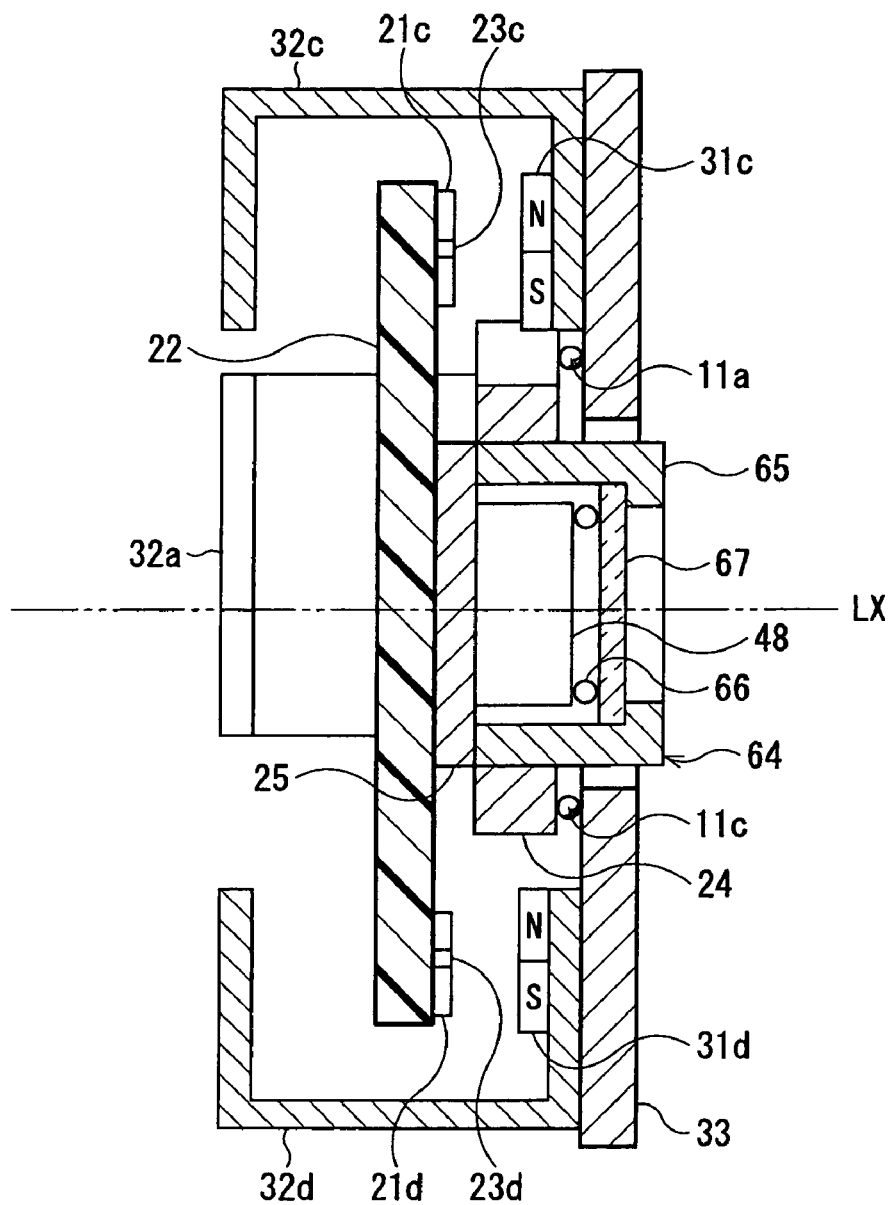
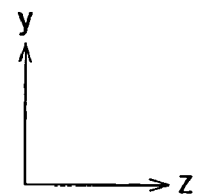

FIG. 11
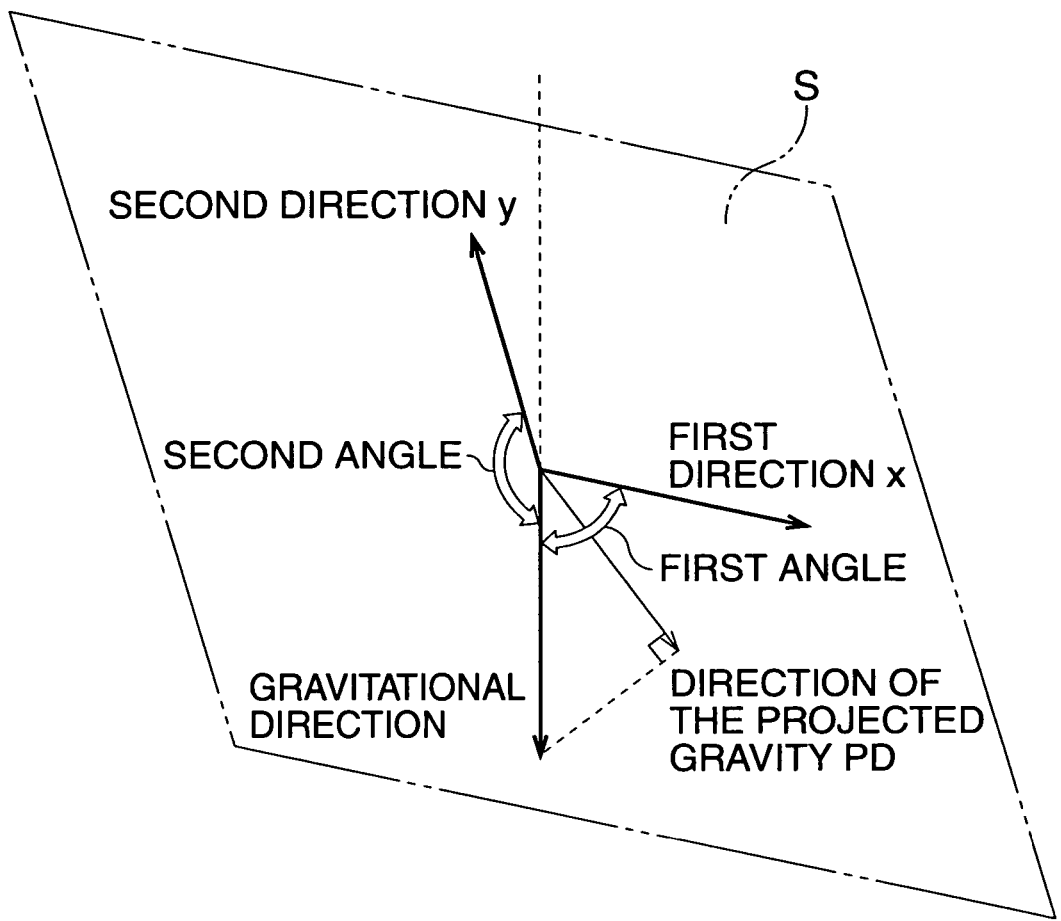
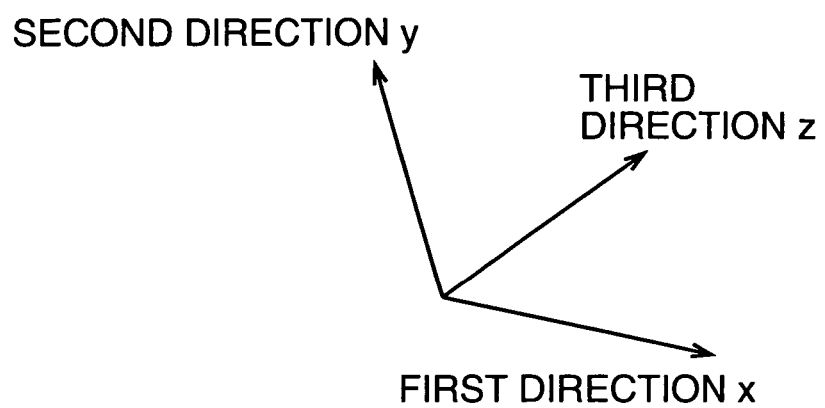

FIG. 13
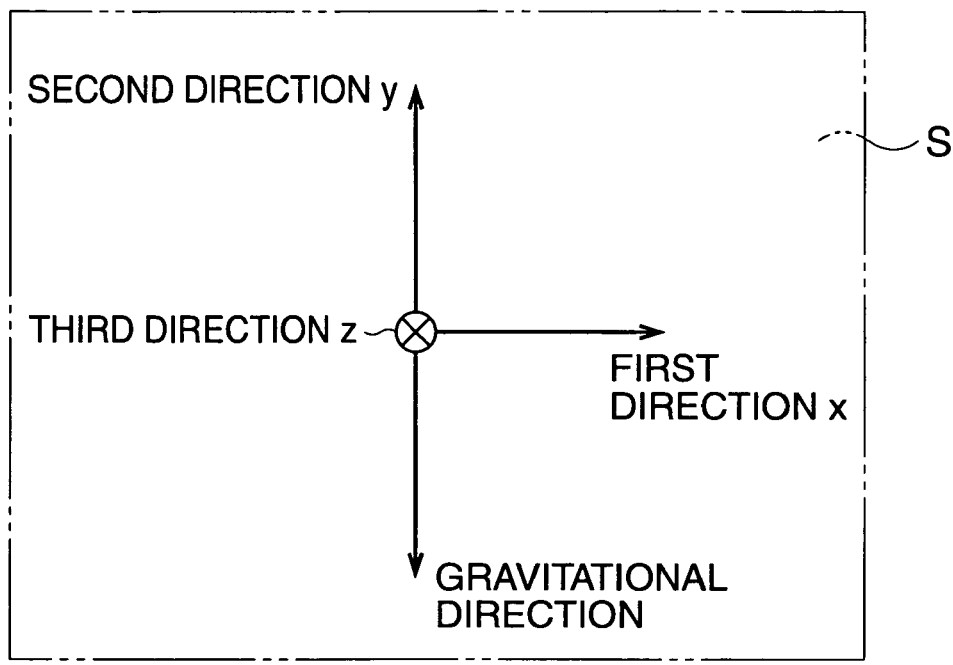
FORCE IN THE SECOND DIRECTION SUPPLIED
BY THE THIRD AND THE FOURTH DRIVING UNITS
TO THE MOVABLE UNIT
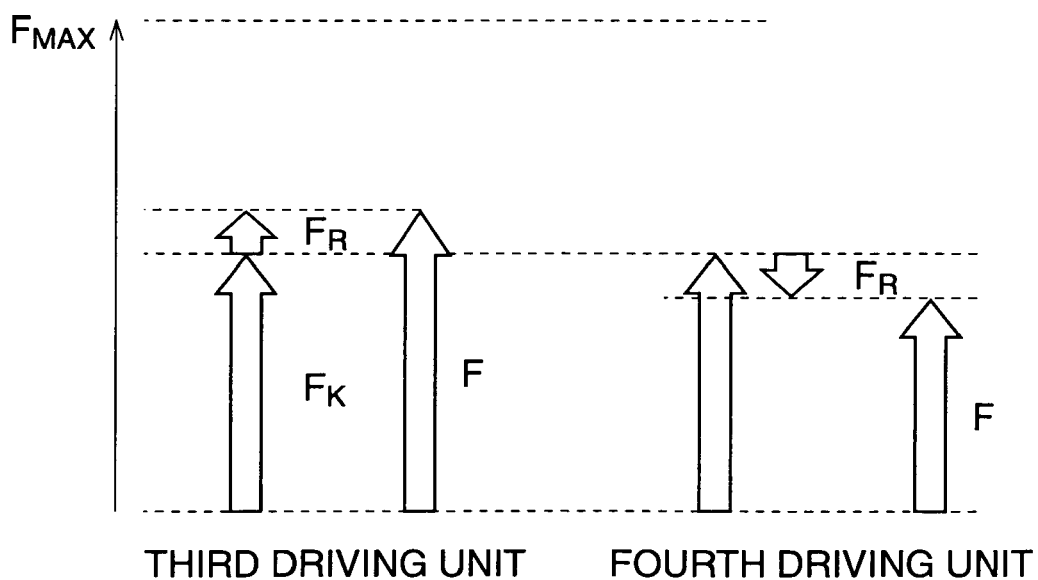

FIG. 14
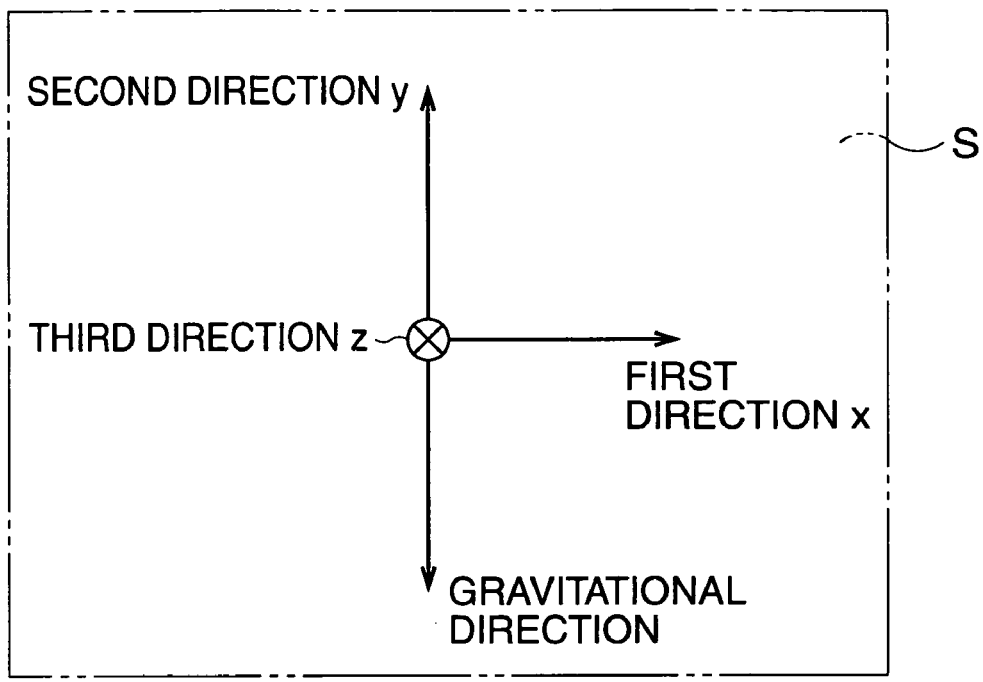
FORCE IN THE FIRST DIRECTION SUPPLIED
BY THE FIRST AND THE SECOND DRIVING UNIT
TO THE MOVABLE UNIT
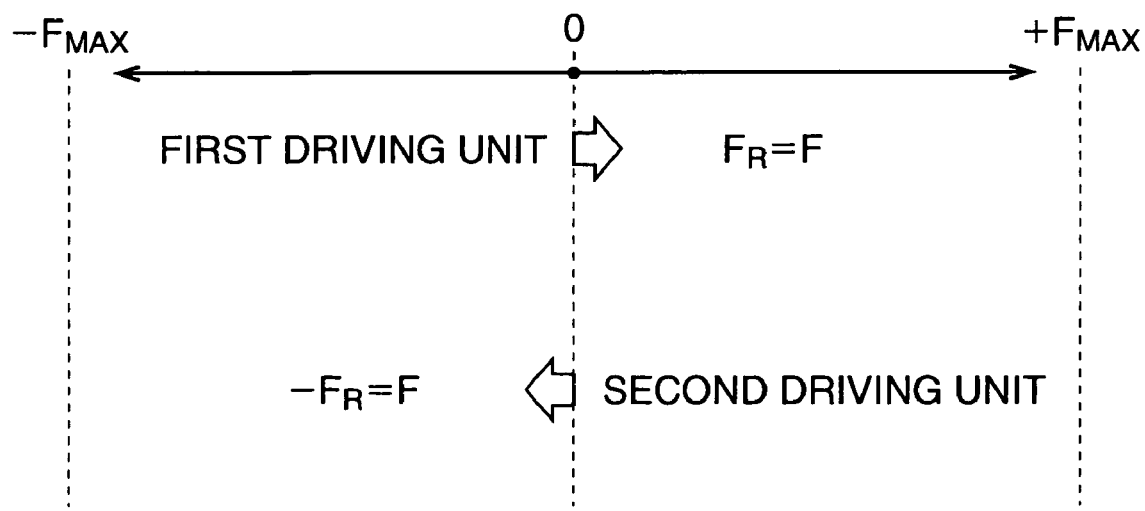

ANTI-SHAKE APPARATUS

BACKGROUND OF THE INVENTION

1. Field of the Invention

The present invention relates to an anti-shake apparatus which can control the direction of the power supplied for performing a linear and rotational movement according to the position of the anti-shake apparatus.

2. Description of the Related Art

In recent years, an anti-shake apparatus for a photographing apparatus has been proposed. The anti-shake apparatus corrects for the hand-shake effect by moving a hand-shake correcting lens or an imaging device on a plane that is perpendicular to the optical axis, corresponding to the amount of hand-shake which occurs during imaging. A movable unit having the hand-shake correcting lens or the imaging device may be shifted by the gravity.

Japanese unexamined patent publication (KOKAI) No. 2003-091028 discloses a camera having an anti-shake apparatus. The anti-shake apparatus comprises two driving units to respectively supply driving forces in the different directions. Further, the anti-shake apparatus comprises a detector for detecting the direction of gravity that acts on the anti-shake apparatus. The anti-shake apparatus can correct the gravity shift by selecting the driving unit to be used for compensating for the gravity shift, according to the detected direction of gravity and by making the selected driving unit generate an additional force to the driving force required for anti shake operation.

However, there is also a rotational movement around an optical axis in the hand-shake effect. Gravity also influences the correction of the rotational movement in the hand-shake correction operation.

SUMMARY OF THE INVENTION

Therefore, an object of the present invention is to provide an anti-shake apparatus that can accurately correct rotational movement caused by the hand-shake effect, regardless of the direction from which gravity acts on the anti-shake apparatus.

According to the present invention, an anti-shake apparatus comprising a movable unit, a fixed unit, a first driving unit, a second driving unit, a third driving unit, a fourth driving unit, a first detector, a second detector, and a control unit is provided. The movable unit is moved in a first and a second direction which is different from the first direction. The movable unit is rotated on a movable-plane that is parallel both to the first and the second direction. The fixed unit supports the movable unit. The first and the second driving units respectively supply a first and a second driving force in the first direction to the movable unit. The third and the fourth driving units respectively supply a third and a fourth driving force in the second direction to the movable unit. The first, the second, the third, and the fourth driving units are attached to one of the movable unit and the fixed unit. The first detector detects the direction of the gravitational force acting on the movable unit. The second detector detects a rotational movement around a straight line perpendicular to the movable-plane. The control unit controls the first, the second, the third, and the fourth driving forces. The control unit controls the third and the fourth driving forces so as to correct the rotational movement when the gravitational direction is parallel to the first direction. The control unit controls the first and the second driving forces so as to correct the rotational movement when the gravitational direction is parallel to the second direction.

BRIEF DESCRIPTION OF THE DRAWINGS

The objects and advantages of the present invention will be better understood from the following description, with reference to the accompanying drawings in which:

FIG. 4 illustrates a construction diagram of the section along line a-a of FIG. 3;

FIG. 11 illustrates the relation between the first direction, the second direction, the gravitational direction, and the direction of the projected gravity when the optical axis of the camera is tilt from the ground;

FIG. 13 illustrates a breakdown of the electromagnetic force of the third and the fourth driving unit when the movable unit is rotated by the driving force of the third and the fourth driving unit in the horizontal position;

FIG. 14 illustrates a breakdown of the electromagnetic force of the first and the second driving unit when the movable unit is rotated by the driving force of the first and the second driving unit in the horizontal position;

DESCRIPTION OF THE PREFERRED EMBODIMENTS

Figure 1:
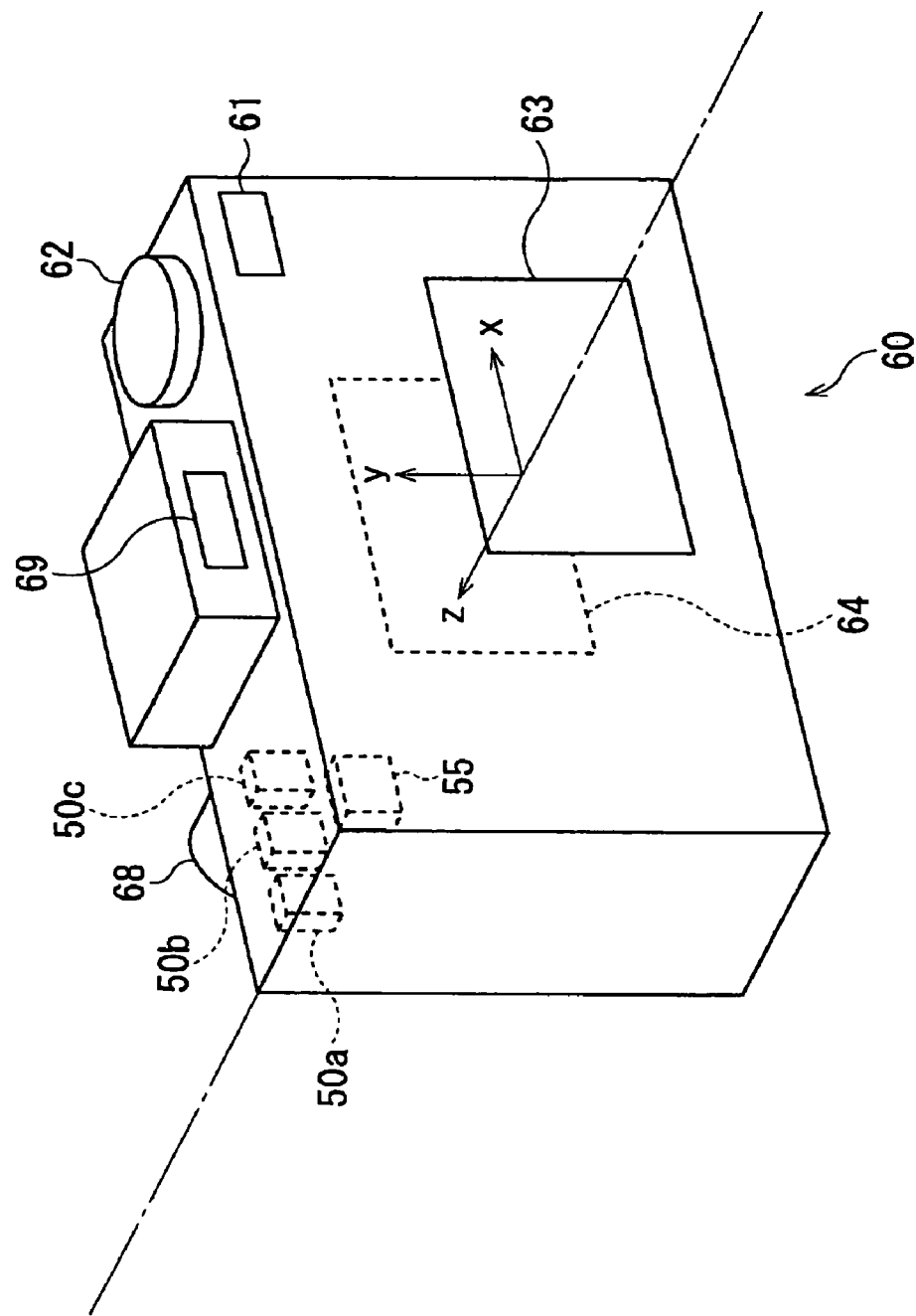
FIG. 1 is a diagram showing the camera having an anti-shake apparatus, in the first and the second embodiments.

The present invention is described below with reference to the embodiments shown in the drawings.

In order to explain the direction in this embodiment, a first direction x, a second direction y, and a third direction z for the camera are defined (see FIG. 1). The first direction x is a horizontal direction which is perpendicular to the optical axis LX and to the ground. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 5.

Figure 3:
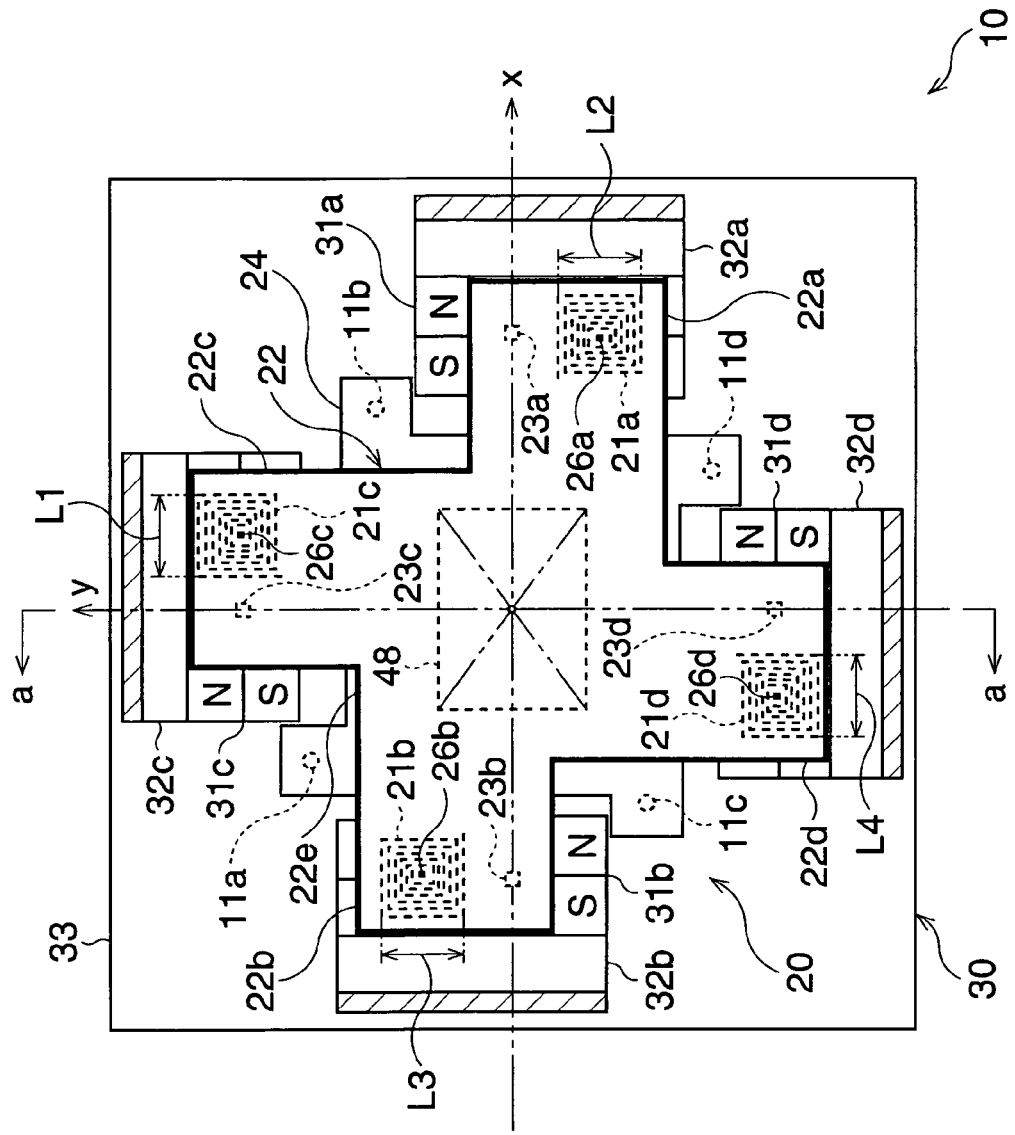
FIG. 3 is a front view of the imaging-device support part, that comprises the movable unit and the fixed unit, in the first embodiment.

FIG. 4 shows a construction diagram of the section along line a-a of FIG. 3.

Figure 2:
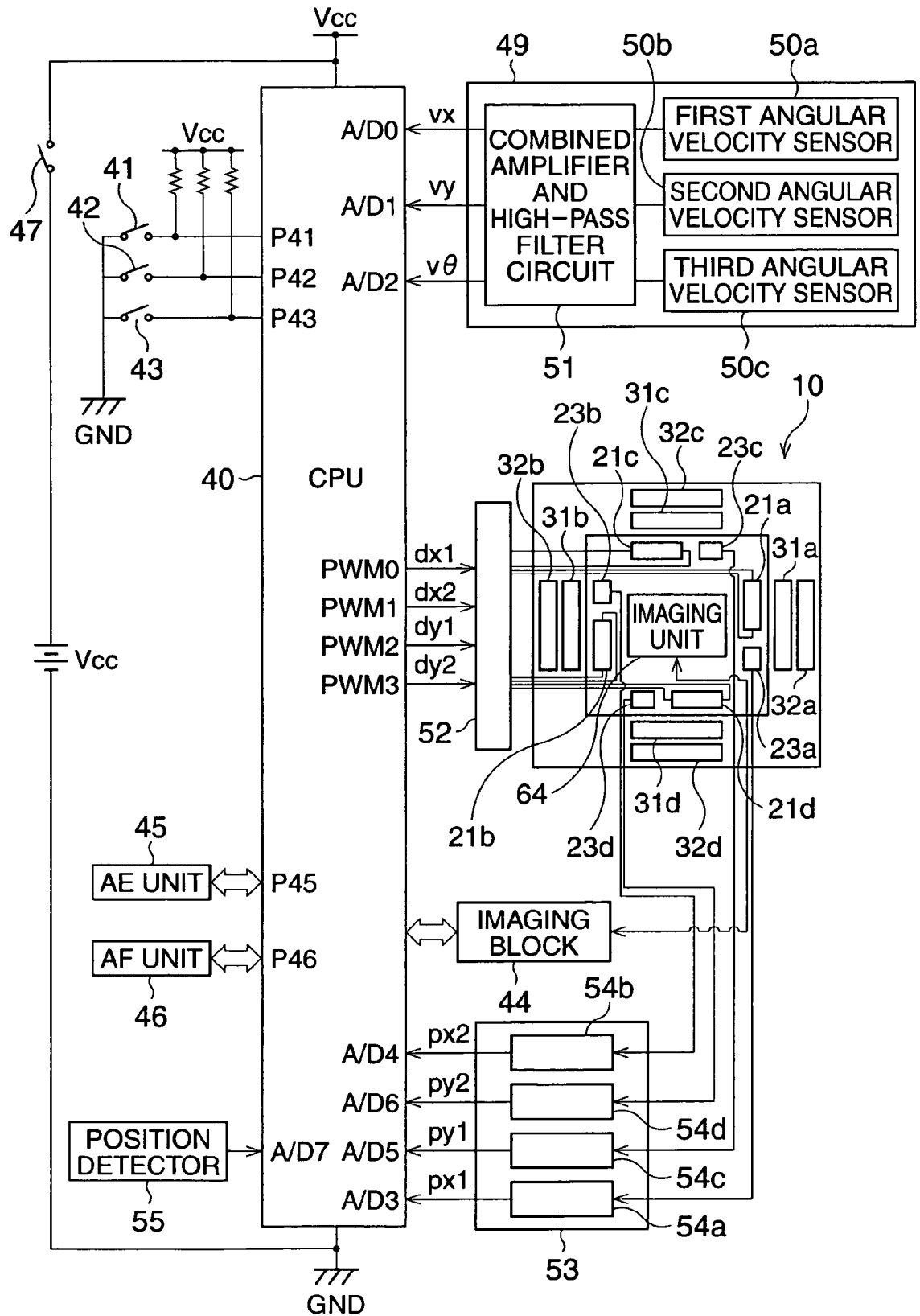
FIG. 2 is a circuit diagram showing the electrical structure of the anti-shake apparatus, in the first and the second embodiments.

A camera 60 comprises a power-on button 61, a release button 62, an LCD monitor 63, a CPU 40, an imaging block 44, an AE (automatic exposure) unit 45, an AF (automatic focus) unit 46, an imaging unit 64, and a camera lens 68 (see FIGS. 1 and 2).

By pushing the power-on button 61, a state of a power-switch 47 is changed from an on state to an off state or from the off state to the on state.

An imaging device 48 is in the imaging unit 64 (see FIG. 4). The imaging device 48 is, for example, a CCD, CMOS, or etc. The light comprising the photographic subject image is received by an imaging device 48 through the camera lens 68. The photographic subject image is displayed at the LCD monitor 63.

When the release button 62 is half pushed by the operator, the photometric switch 41 changes to the on state, so that the photometric operation, the AF sensing operation, and the focusing operation are performed.

When the release button 62 is fully pushed by the operator, the release switch 42 changes to the on state, so that the imaging operation is performed.

The CPU 40 controls each component of the camera 60, regarding some operations of the camera 60 including the anti-shake operation, that is explained later.

The imaging block 44 drives the imaging unit 64. The AE unit 45 performs the photometric operation for the photographic subject and then calculates the exposure value. Corresponding to the exposure value, the AE unit 45 calculates the aperture value and the time length of the exposure time, that are needed for imaging. The AF unit 46 performs the AF sensing operation. Corresponding to the result of the AF sensing operation, the AF unit 46 performs the focusing operation, that is needed for imaging. In the focusing operation, the position of the camera lens 68 is moved in the optical axis LX direction.

The anti-shaking part of the camera 60 comprises the CPU 40, an angular velocity detecting unit 49, a driver circuit 52, an imaging device supporting-apparatus 10, and a position detector 55 (see FIGS. 1 and 2).

The anti-shake switch 43 changes to the on state when the anti-shake button 69 is pushed by the operator. In the on state of the anti-shake switch 43, the anti-shake operation is performed by driving the angular velocity detecting unit 49 and the imaging device supporting-apparatus 10 at every predetermined time interval. The anti-shaking operation is performed independently of the other operations including the above mentioned photometric operation etc.

The various output commands corresponding to the input signals of the switches 41~43 are controlled by the CPU 40.

The information regarding whether the photometric switch 41 is in the on or off state, is input to port P41 of the CPU 40 as 1 1-bit digital signal.

The information regarding whether the release switch 42 is in the on or off state, is input to port P42 of the CPU 40 as 1 1-bit digital signal.

The information regarding whether the anti-shake switch 43 is in the on or off state, is input to port P43 of the CPU 40 as 1 1-bit digital signal.

Next, the details of the input and output relationship with the CPU 40 for the angular velocity unit 49, the position detector 55, the driver circuit 52, the imaging device supporting-apparatus 10, and the hall-element signal-processing unit 53, are explained.

The angular velocity unit 49 comprises a first angular velocity sensor 50a, a second velocity sensor 50b, a third velocity sensor 50c, and a combined amplifier and high-pass filter circuit 51. The first angular velocity sensor 50a detects the velocity-component in the first direction x of the angular velocity of the camera 60, at every predetermined time interval (1 ms). The second angular velocity sensor 50b detects the velocity-component in the second direction y of the angular velocity of the camera 60, at every predetermined time interval (1 ms). The third angular velocity sensor 50c detects the rotation-velocity-component of the angular velocity on a plane perpendicular to the third direction z, hereinafter referred to as a movable-plane, at every predetermined time interval (1 ms).

The combined amplifier and high-pass filter circuit 51 amplifies the signals regarding the first direction x of the angular velocity, that is the velocity-component in the first direction x of the angular velocity. Then the combined amplifier and high-pass filter circuit 51 reduces a null voltage and a panning of the first angular velocity sensor 50a from the amplified signal regarding the first direction x of the angular velocity. After that, the combined amplifier and high-pass filter circuit 51 outputs the analogue signal to the A/D converter A/D 0 of the CPU 40 as a first angular velocity vx.

The combined amplifier and high-pass filter circuit 51 amplifies the signals regarding the second direction y of the angular velocity, that is the velocity-component in the second direction y of the angular velocity. Then the combined amplifier and high-pass filter circuit 51 reduces a null voltage and a panning of the second angular velocity sensor 50b from the amplified signal regarding the second direction y of the angular velocity. After that, the combined amplifier and high-pass filter circuit 51 outputs the analogue signal to the A/D converter A/D 1 of the CPU 40 as a second angular velocity vy.

The combined amplifier and high-pass filter circuit 51 amplifies the signals regarding the rotation-speed of the angular velocity, that is the rotation-velocity-component on the movable-plane of the angular velocity. Then the combined amplifier and high-pass filter circuit 51 reduces a null voltage and a panning of the third angular velocity sensor 50c from the amplified signal regarding the rotation-speed of the angular velocity. After that, the combined amplifier and high-pass filter circuit 51 outputs the analogue signal to the A/D converter A/D 2 of the CPU 40 as a third angular velocity vθ.

The CPU 40 converts the first, the second, and the third angular velocity vx, vy, vθ, that are input respectively to the A/D converters A/D 0, A/D 1, and A/D 2, to digital signals. Then the CPU 40 calculates the hand-shake quantity that occurs in the predetermined time (1 ms), based on the converted digital signals and the converting coefficient, where a focal distance is considered. This hand-shake quantity includes a component in the first direction x, a component in the second direction y, and a rotation component on the movable-plane.

The CPU 40 calculates the position S of the imaging unit 64, that should be moved to and rotated to, corresponding to the hand-shake quantity calculated, for the first direction x, the second direction y, and the rotation angle.

The location in the first direction x of the position S is defined as sx. The location in the second direction y of the position S is defined as sy. The rotation angle on the movable-plane of the position S is defined as sθ.

The movement of the movable unit 20 including the imaging unit 64 is performed by using electromagnetic force and is described later. The driving force D for moving and rotating the movable unit 20 to the position S has a first horizontal PWM duty dx1 as one of the driving-force components in the first direction x, a second horizontal PWM duty dx2 as another driving-force component in the first direction x, a first vertical PWM duty dy1 as one of the driving-force components in the second direction y, and a second vertical PWM duty dy2 as another driving-force component in the second direction y. The first and second horizontal PWM duties dx1, dx2 from the PWM 0 and the PWM 1 of the CPU 40, and the first and second vertical PWM duties dy1, dy2 from the PWM 2 and the PWM 3 of the CPU 40 are input to the driving circuit 52.

The imaging device supporting-apparatus 10 comprises the movable unit 20 and a fixed unit 30 (see FIGS. 2 and 3). The movable unit 20 has the imaging unit 64. The imaging device supporting-apparatus 10 makes the imaging unit 64 move and rotate to the position S. Owing to the movement and the rotation to the position S, a movement of the photographic image on the imaging surface of the imaging device 48 during imaging is cancelled. Then, the photographing subject image that reaches the imaging surface of the imaging device 48 is stabilized. Consequently, the hand-shake effect can be corrected.

The driving of the movable unit 20 is performed by a first, a second, a third, and a fourth driving unit (not depicted). The first, the second, the third, and the fourth driving units are controlled by the driving circuit 52 based on the first and the second horizontal PWM duties dx1, dx2, and the first and the second vertical PWM duties dy1, dy2.

The detected-position P of the movable unit 20, that is moved and rotated to, by the first, the second, the third, and the fourth driving units, is detected by a first, a second, a third, and a fourth hall element 23a, 23b, 23c, 23d, and the hall-element signal-processing unit 53 (position-detecting operation).

A first and a second horizontal detected-position signal px1, px2, that correspond to position components of the first direction x, are input respectively to the A/D converter A/D3, A/D4 of the CPU 40. A first and a second vertical detected-position signal py1, py2, that correspond to position components of the second direction y, are input to the A/D converter A/D5, A/D6 of the CPU40. The first and the second horizontal detected-position signals px1, px2, that are analogue signals, are converted to digital signals respectively through the A/D converter A/D3, A/D4 (A/D converting operation). The first and the second vertical detected-position signals py1, py2, that are analogue signals, are converted to digital signals respectively through the A/D converters A/D5, A/D6 (A/D converting operation).

A first data in the first direction x for the detected-position P, after the A/D converting operation, is defined as pdx1, corresponding to the first horizontal detected-position signal px1. A second data in the first direction x for the detected-position P, after the A/D converting operation, is defined as pdx2, corresponding to the second horizontal detected-position signal px2. A first data in the second direction y for the detected-position P, after the A/D converting operation, is defined as pdy1, corresponding to the vertical detected-position signal py1. A second data in the second direction y for the detected-position P, after the A/D converting operation, is defined as pdy2, corresponding to the vertical detected-position signal py2.

A first location pxx in the first direction x for the detected-position P is calculated by the CPU 40 based on the data pdx1, pdx2, pdy1, pdy2. A second location pyy in the second direction y for the detected-position P is calculated by the CPU 40 based on the data pdx1, pdx2, pdy1, pdy2. A rotation angle pθ on the xy plane for the detected-position P is calculated by the CPU 40 based on the data pdx1, pdx2, pdy1, pdy2.

The position detector 55 is an acceleration sensor. The position detector 55 detects a direction of a projected gravity. A gravitational direction, projected on the movable-plane from a view from the third direction z, is defined as the direction of the projected gravity. A third tilt-angle tθ ($-180°<=t\theta<=180°$) is detected based on the gravitational direction. An angle between the gravitational direction and the negative direction of the second direction y is defined as the third tilt-angle tθ. The third tilt-angle to is input to the A/D converter A/D 7 of the CPU 40. The third tilt-angle tθ, that is an analogue signal, is converted to a digital signal through the A/D converter A/D 7 (A/D converting operation).

Movements of the first, the second, and the third driving units are controlled based on the data for the detected-position P (pxx, pyy, pθ) of the movable unit 10, the data for the position S (sx, sy, sθ), that should be moved to and rotated to, and the data of the third tilt-direction tθ.

The first driving unit comprises a first coil 21a and a first magnet 31a, that are used for a movement in the first direction x. The second driving unit comprises a second coil 21b and a second magnet 31b, that are used for a movement in the first direction x. The third driving unit comprises a third coil 21c and a third magnet 31c, that are used for a movement in the second direction x. The fourth driving unit comprises a fourth coil 21d and a fourth magnet 31d, that are used for a movement in the second direction y.

The movable unit 20 comprises a movable circuit board 22, the first, the second, the third, and the fourth coils 21a, 21b, 21c, 21d, the imaging unit 64, the first, the second, the third, and the fourth hall elements 23a, 23b, 23c, 23d, a ball-contact board 24, and a plate 25 (see FIGS. 3 and 4).

The fixed unit 30 comprises the first, the second, the third, and the fourth magnets 31a, 31b, 31c, 31d, a first, a second, a third, and a fourth yoke 32a, 32b, 32c, and a base board 33 (see FIGS. 3 and 4).

The first, the second, the third, and the fourth balls 11a, 11b, 11c, 11d are held between the movable unit 20 and the fixed unit 30. The first, the second, the third, and the fourth balls 11a, 11b, 11c, 11d are located on a single plane perpendicular to the third direction z. The first, the second, the third, and the fourth balls 11a, 11b, 11c, 11d can roll between the ball-contact board 24 and the base board 33. A contact of the movable unit 20 and the fixed unit 30 is kept through the first, the second, the third, and the fourth balls 11a, 11b, 11c, 11d. Accordingly, the movable unit 20 is supported by the fixed unit 30 as the movable unit 20 can move in the first direction x and the second direction y and rotate bout a line parallel to the optical axis LX.

The movable unit 20 is urged to the fixed unit 30 in the third direction z by an urging member, such as a spring etc., and fixed in the fixed unit 30 or the camera 60. The movable and rotatable situation of the movable unit 20 on the movable-plane is maintained.

The imaging surface of the imaging device 48 is shaped like a rectangle. The imaging surface has two diagonal lines. The intersection point of these two diagonal lines is defined as the center of the imaging device 48.

When the center of the imaging device 48 is located on the optical axis LX of the camera lens 68, the location relation between the movable unit 20 and the fixed unit 30 is set up so that the movable unit 20 is located at the center of its movable range in both the first direction x and the second direction y, in order to utilize the full size of the imaging range of the imaging device 48. Further, in the initial situation before the movable unit 20 moves and rotates, the location relation between the movable unit 20 and the fixed unit 20 is set up so that the movable unit 20 is located at the center of the movable range. Further in the initial situation, the location relation between the movable unit 20 and the fixed unit 30 is set up so that the four sides of the imaging surface of the imaging device 48 can be parallel to the first direction x or the second direction y.

The imaging unit 64 and the plate 25 are attached to the movable circuit board 22 of the movable unit 20 in order along the optical axis LX direction, viewed from the side of the camera lens 68. The imaging unit 64 comprises the imaging device 48, a stage 65, a pressing member 66, and an optical low pass filter 67. The stage 65 and the plate 25 hold the imaging device 48, the pressing member 66, and the optical low pass filter 67 in the optical axis LX direction. The ball-contact board 24 is attached to the stage 65.

The imaging device 48 is attached to the movable circuit board 22 through the plate 25. The plate 25 is made of a metallic material. The plate 25 has an effect of radiating heat from the imaging device 48, by contacting the imaging device 48. The imaging device is positioned so as that the imaging surface of the imaging device 48 is perpendicular to the optical axis LX of the camera lens 68.

The movable circuit board 22 is shaped nearly like a cross. The movable circuit board 22 comprises a central member 22e, a first, a second, a third, and a fourth side member 22a, 22b, 22c, 22d. The first and second side members 22a, 22b extend from the central member 22e in the second direction y. The third and the fourth side members 22c, 22d extend from the central member 22e in the first direction x.

The imaging unit 64 is attached to the central member 22e. The first coil 21a is attached to the first side member 22a. The second coil 21b is attached to the second side member 22b. The third coil 21c is attached to the third side member 22c. The fourth coil 21c is attached to the fourth side member 22d. The first, the second, the third, and the fourth coils 21a, 21b, 21c, 21d form a sheet and a spiral shape coil pattern.

The coil pattern of the first coil 21a has a line segment that is parallel to the second direction y before the movable unit 20 is rotated. The line segment that is parallel to the second direction y is used for generating a first electromagnetic force Pw1, of which the direction is the first direction x. The movable unit 20 is moved in the first direction x by the first electromagnetic force Pw1.

The coil pattern of the second coil 21b has a line segment that is parallel to the second direction y before the movable unit 20 is rotated. The line segment that is parallel to the second direction y is used for generating a second electromagnetic force Pw2, of which the direction is the first direction x. The movable unit 20 is moved in the first direction x by the second electromagnetic force Pw2.

The coil pattern of the third coil 21c has a line segment that is parallel to the first direction x, before the movable unit 20 is rotated. The line segment that is parallel to the first direction x is used for generating a third electromagnetic force Pw3, of which the direction is the second direction y. The movable unit 20 is moved in the second direction y by the third electromagnetic force Pw3.

The coil pattern of the fourth coil 21d has a line segment that is parallel to the first direction x, before the movable unit 20 is rotated. The line segment that is parallel to the first direction x is used for generating a fourth electromagnetic force Pw4, of which the direction is the second direction y. The movable unit 20 is moved in the second direction y by the fourth electromagnetic force Pw4.

The first electromagnetic force Pw1 along the first direction x occurs based on the current flowing on the line segment, that is parallel to the second direction y, of the first coil 21a and the magnetic field of the first magnet 31a.

The second electromagnetic force Pw2 along the first direction x occurs based on the current flowing in the line segment, that is parallel to the second direction y, of the second coil 21b and the magnetic field of the second magnet 31b.

The third electromagnetic force Pw3 along the second direction y occurs based on the current flowing in the line segment, that is parallel to the first direction x, of the third coil 21c and the magnetic field of the third magnet 31c.

The fourth electromagnetic force Pw4 along the second direction y occurs based on the current flowing in the line segment, that is parallel to the first direction x, of the fourth coil 21d and the magnetic field of the fourth magnet 31d.

The first electromagnetic force Pw1 is a resultant force, that is comprised by all forces generated in all line segments, parallel to the second direction y, of the first coil 21a. A single point considered to receive the first electromagnetic force Pw1 is defined as a first driving point 26a. The coil pattern of the first coil 21a is formed so that the first driving point 26a is located at the center of the first coil 21a.

The second electromagnetic force Pw2 is a resultant force, that is comprised of all the forces generated in all line segments, parallel to the second direction y, of the second coil 21b. A single point considered to receive the second electromagnetic force Pw2 is defined as a second driving point 26b. The coil pattern of the second coil 21b is formed so that the second driving point 26b is located at the center of the second coil 21b.

The third electromagnetic force Pw3 is a resultant force, that is comprised by all forces generated at all line segments, parallel to the first direction x, of the third coil 21c. A single point considered to receive the third electromagnetic force Pw3 is defined as a third driving point 26c. The coil pattern of the third coil 21c is formed so that the third driving point 26c is located at the center of the third coil 21c.

The fourth electromagnetic force Pw4 is a resultant force, that is comprised of all forces generated in all line segments, parallel to the first direction x, of the fourth coil 21d. A single point considered to receive the fourth electromagnetic force Pw4 is defined as a fourth driving point 26d. The coil pattern of the fourth coil 21d is formed so that the fourth driving point 26d is located at the center of the fourth coil 21d.

The first and the second coils 21a, 21b are respectively attached to the first and the third side members 22a, 22b so that the following conditions are satisfied. One condition is that the center of the imaging device 48 agrees with the center of a line segment connecting the first and the second driving points 26a, 26b. Another condition is that the line segment connecting the first and the second driving points 26a, 26b crosses a line parallel to the first direction x in the initial situation before the movable unit 20 moves and rotates. In other words, the line segment connecting the first and the second driving points 26a, 26b is not parallel to the first direction x in the initial situation before the movable unit 20 moves and rotates.

The third and the fourth coils 21c, 21d are attached respectively to the third and the fourth side members 22a, 22b so that the following conditions are satisfied. One condition is that the center of the imaging device 48 agrees with the center of a line segment connecting the third and the fourth driving points 26c, 26d. Another condition is that the line segment connecting the third and the fourth driving points 26c, 26d crosses a line parallel to the second direction y. In other words, the line segment connecting the third and the fourth driving points 26c, 26d is not parallel to the second direction y.

Therefore, the movable unit 20 can be moved on a plane parallel to the movable-plane and rotated around a line passing through the center of the imaging device 48 and being perpendicular to the movable-plane, by controlling a size and a direction of the first, the second, the third, and the fourth electromagnetic force Pw1, Pw2, Pw3, Pw4.

The first, the second, the third, and the fourth coils 21a, 21b, 21c, 21d are connected with the driver circuit 52 through a flexible circuit board (not depicted). The driver circuit 52 drives the first, the second, the third, and the fourth coils 21a, 21b, 21c, 21d. As described above, the first and the second horizontal PWM duties dx1, dx2 are input to the driver circuit 52 respectively from the PWM 0 and PWM 1 of the CPU 40. The first and the second vertical PWM duties dy1, dy2 are input to the driver circuit 52 from the PWM 2 and PWM 3 of the CPU 40.

The driver circuit 52 supplies power to the first and second coils 21a, 21b respectively corresponding to the values of the first and the second horizontal PWM duties dx1, dx2. The movable unit 20 is moved in the first direction x and rotated on the movable-plane by the first and second electromagnetic forces Pw1, Pw2 generated with the power supplied to the first and second coils 21a, 21b. The driver circuit 52 supplies power to the third and fourth coils 21c, 21d respectively corresponding to the values of the first and second vertical PWM duties dy1, dy2. The movable unit 20 is moved in the second direction y and rotated on the movable-plane by the third and the fourth electromagnetic forces Pw3, Pw4 generated with a power supplied to the third and the fourth coils 21c, 21d.

The first hall element 23a is attached to the first side member 22a so that the first hall element 23a is located at a point intersecting a line, that passes through the center of the imaging device 48 and is parallel to the first direction x, and a line, that passes through the first driving point 26a and is parallel to the second direction y. The second hall element 23b is attached to the second side member 22b so that the second hall element 23b is located at a point intersecting a line, that passes through the center of the imaging device 48 and is parallel to the first direction x, and a line, that passes through the second driving point 26b and is parallel to the second direction y.

The third hall element 23c is attached to the third side member 22c so that the third hall element 23c is located at a point intersecting a line, that passes through the center of the imaging device 48 and is parallel to the second direction y, and a line, that passes through the third driving point 26c and is parallel to the first direction x. The fourth hall element 23d is attached to the fourth side member 22d so that the fourth hall element 23d is located at a point intersecting a line, that passes through the center of the imaging device 48 and is parallel to the second direction y, and a line, that passes through the fourth driving point 26d and is parallel to the first direction x.

The first, the second, the third, and the fourth yokes 32a, 32b, 32c, 32d and the first, the second, the third, and the fourth magnets 31a, 31b, 31c, 31d are attached to the base board 33 of the fixed unit 30. The base board 33 is positioned between the movable circuit board 22 and the camera lens 68 so that the base board 33 is kept parallel to the imaging surface of the imaging device 48. The movable circuit board 22 may be arranged between the base board 33 and the camera lens 68.

The first magnet 31a is attached to the movable unit 20 side of the fixed unit 30 through the first yoke 32a. The first magnet 31a is positioned on the fixed unit 30 so that the first magnet 31a faces the first coil 21a and the first hall element 23a in the third direction z.

Similarly, the second magnet 31b is attached to the movable unit 20 side of the fixed unit 30 through the second yoke 32b. The second magnet 31b is positioned on the fixed unit 30 so that the second magnet 31b faces the second coil 21b and the second hall element 23b in the third direction Z.

Similarly, the third magnet 31c is attached to the movable unit 20 side of the fixed unit 30 through the third yoke 32c. The third magnet 31c is positioned on the fixed unit 30 so that the third magnet 31c faces the third coil 21c and the third hall element 23c in the third direction Z.

Similarly, the fourth magnet 31d is attached to the movable unit 20 side of the fixed unit 30 through the fourth yoke 32d. The fourth magnet 31d is positioned on the fixed unit 30 so that the fourth magnet 31d faces the fourth coil 21d and the fourth hall element 23d in the third direction z.

The N pole and the S pole of the first and the second magnets 31a, 31b are arranged in the first direction x. The N pole and the S pole of the third and the fourth magnets 31c, 31d are arranged in the second direction y.

The first yoke 32a is made of a soft magnetic material. The first yoke 32a forms a square-u-shape channel when viewed from the second direction y. The first yoke 32a is fixed on the movable unit 20 side of the base board 33. The first magnet 31a, the first coil 21a, and the first hall element 23a are inside the channel of the first yoke 32a in the third direction z.

The side of the first yoke 32a contacting the first magnet 31a prevents the magnetic-field of the first magnet 31a from leaking to the surroundings. The other side of the first yoke 32a raises the magnetic-flux density between the first magnet 31a and the first coil 21a and between the first magnet 31a and the first hall element 23a.

The second yoke 32b is made of a soft magnetic material. The second yoke 32b forms a square-u-shape channel when viewed from the second direction y. The second yoke 32b is fixed on the movable unit 20 side of the base board 33. The second magnet 31b, the second coil 21b, and the second hall element 23b are inside the channel of the second yoke 32b in the third direction z.

The side of the second yoke 32b contacting the second magnet 31b prevents the magnetic-field of the second magnet 31b from leaking to the surroundings. The other side of the second yoke 32b raises the magnetic-flux density between the second magnet 31b and the second coil 21b and between the second magnet 31b and the second hall element 23b.

The third yoke 32c is made of a soft magnetic material. The third yoke 32c forms a square-u-shape channel when viewed from the first direction x. The third yoke 32c is fixed on the movable unit 20 side of the base board 33. The third magnet 31c, the third coil 21c, and the third hall element 23c are inside the channel of the third yoke 32c in the third direction z.

The side of the third yoke 32c contacting the third magnet 31c prevents the magnetic-field of the third magnet 31c from leaking to the surroundings. The other side of the third yoke 32c raises the magnetic-flux density between the third magnet 31c and the third coil 21c and between the third magnet 31c and the third hall element 23c.

The fourth yoke 32d is made of a soft magnetic material. The fourth yoke 32d forms a square-u-shape channel when viewed from the first direction x. The fourth yoke 32d is fixed on the movable unit 20 side of the base board 33. The fourth magnet 31d, the fourth coil 21d, and the fourth hall element 23d are inside the channel of the fourth yoke 32d in the third direction z.

The side of the fourth yoke 32d contacting the fourth magnet 31d prevents the magnetic-field of the fourth magnet 31d from leaking to the surroundings. The other side of the fourth yoke 32d raises the magnetic-flux density between the fourth magnet 31d and the fourth coil 21d and between the fourth magnet 31d and the fourth hall element 23d.

The first, the second, the third, and the fourth hall elements 23a, 23b, 23c, 23d are electromagnetic converting elements using the Hall Effect and are one-axis hall elements. The first hall element 23a detects the first horizontal detected-position signal px1. The second hall element 23b detects the second horizontal detected-position signal px2. The third hall element 23c detects the first vertical detected-position signal py1. The fourth hall element 23d detects the second vertical detected-position signal py2.

When the center of the imaging device 48 passes through the optical axis LX before the movable unit 20 is rotated, the first hall element 23a is located at a place facing an intermediate area between the N pole and the S pole of the first magnet 31a, viewed from the third direction z. Consequently, the position-detecting operation is performed, utilizing the full size of the range in which an accurate position-detecting operation can be performed based on the linear output-change of the one-axis hall element.

Similarly, when the center of the imaging device 48 passes through the optical axis LX before the movable unit 20 is rotated, a position of the second hall element 23b in the first direction x faces an intermediate area between the N pole and the S pole of the second magnet 31b, viewed from the third direction z. When the center of the imaging device 48 passes through the optical axis LX before the movable unit 20 is rotated, a position of the third hall element 23c in the second direction y faces an intermediate area between the N pole and the S pole of the third magnet 31c, viewed from the third direction z. When the center of the imaging device 48 passes through the optical axis LX before the movable unit 20 is rotated, a position of the fourth hall element 23d in the second direction y faces an intermediate area between the N pole and the S pole of the fourth magnet 31d, viewed from the third direction z.

The hall-element signal-processing unit 53 comprises a first, a second, a third, and a fourth hall-element signal-processing circuits 54a, 54b, 54c, 54d. The first, the second, the third, and the fourth hall-element signal-processing circuit 54a, 54b, 54c, 54d are connected respectively with the first, the second, the third, and the fourth hall elements 23a, 23b, 23c, 23d through a flexible circuit board (not depicted).

The first hall-element signal-processing circuit 54a detects a first horizontal potential-difference between the output terminals of the first hall element 23a based on an output signal of the first hall element 23a. The first hall-element signal-processing circuit 54a outputs the first horizontal detected-position signal px1 to the A/D converter A/D3 of the CPU 40, based on the vertical potential-difference (see FIG. 2). The first horizontal detected-position signal px1 specifies a location of the part, of the movable unit 20, having the first hall element 23a (the point A of FIG. 5) in the first direction x.

The second hall-element signal-processing circuit 54b detects a second horizontal potential-difference between the output terminals of the second hall element 23b based on an output signal of the second hall element 23b. The second hall-element signal-processing circuit 54b outputs the second horizontal detected-position signal px2 to the A/D converter A/D4 of the CPU 40, based on the second horizontal potential-difference (see FIG. 2). The second horizontal detected-position signal px2 specifies a location of the part, of the movable unit 20, having the second hall element 23b (the point B of FIG. 5) in the first direction x.

The third hall-element signal-processing circuit 54c detects a first vertical potential-difference between the output terminals of the third hall element 23c based on an output signal of the third hall element 23c. The third hall-element signal-processing circuit 54c outputs the first horizontal detected-position signal py1 to the A/D converter A/D5 of the CPU 40, based on the first vertical potential-difference (see FIG. 2). The first vertical detected-position signal py1 specifies another location of the part of the movable unit 20 comprising the third hall element 23c (the point C of FIG. 5) in the second direction y.

The fourth hall-element signal-processing circuit 54d detects a second vertical potential-difference between the output terminals of the fourth hall element 23d based on an output signal of the fourth hall element 23d. The fourth hall-element signal-processing circuit 54d outputs the second horizontal detected-position signal py2 to the A/D converter A/D6 of the CPU 40, based on the second vertical potential-difference (see FIG. 2). The second vertical detected-position signal py2 specifies another location of the part of the movable unit 20 comprising the fourth hall element 23d (the point D of FIG. 5) in the second direction y.

The four hall elements 23a, 23b, 23c, 23d are used for specifying the location and the rotation angle of the movable unit 20. The first and second hall elements 23a, 23b specify the location in the first direction x of two points (the points A and B) on the movable unit 20. The third and fourth hall elements 23c, 23d specify the locations in the second direction y of two points (the points C and D) on the movable unit 20. The location of the movable unit 20 and the rotation angle of the movable unit 20 on the movable-plane can be specified based on the information regarding the locations in the first direction x of the points A and B and the locations in the second direction y of points C and D.

Figure 5:
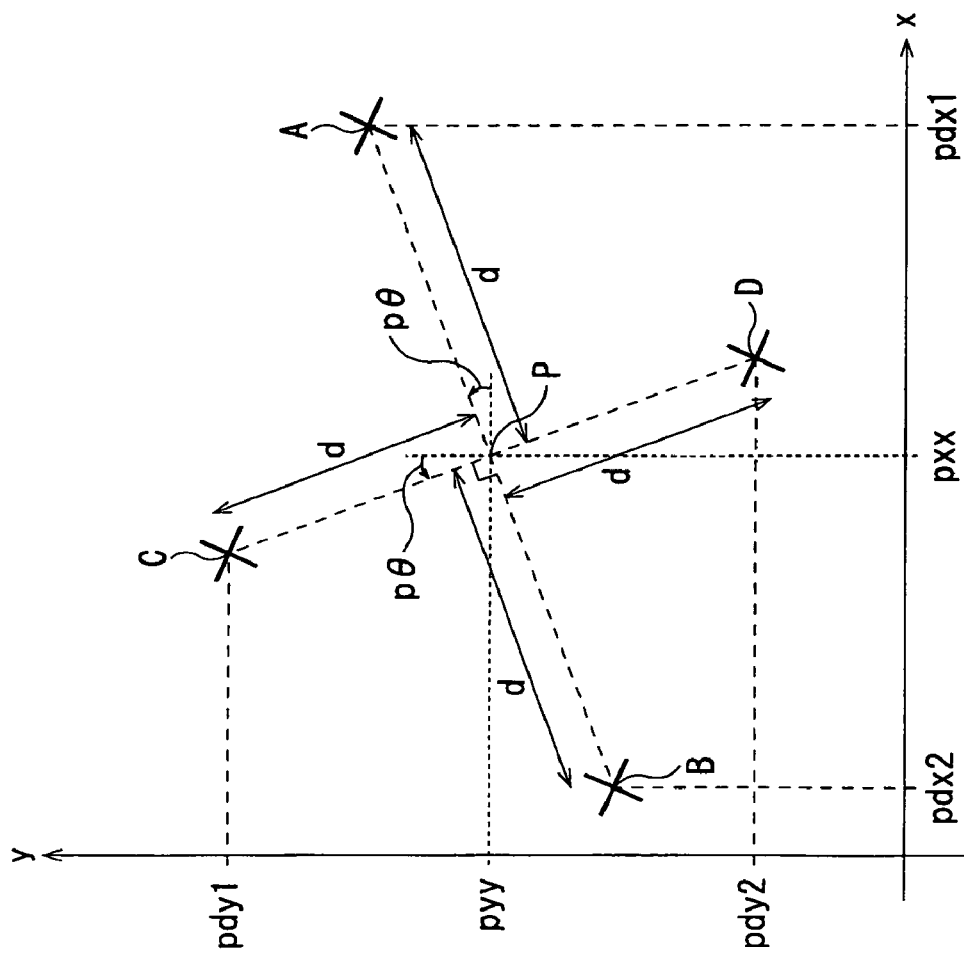
FIG. 5 is a diagram of a movable-plane for explaining how to calculate the position of P based on two locations in the first direction and two locations in the second direction.

It is explained using FIG. 5 how to specify a location and a rotation angle of the movable unit 20. The point A, the point B, the point C, and the point D are points where the first, the second, the third, and the fourth hall elements 23a, 23b, 23c, 23d are respectively located on the movable unit 20. A point intersecting a line segment AB and a line segment CD is defined as a point P.

The location and the rotation angle of the point P (pxx, pyy, pθ) is calculated based on the information regarding the locations in the first direction x of the point A and B and the locations in the second direction y of points C and D.

The first, the second, the third, and the fourth hall elements 23a, 23b, 23c, 23d and the imaging device 48 are arranged on the movable unit 20 so that the line segment AB and the line segment CD intersect at both intermediate points of the line segments, so that the point P is the intersection point of the line segment AB and the line segment CD, and so that the center of the imaging device 48 agrees with the point P in the third direction.

The location in the first direction x of the point A is detected by the first hall element 23a, as the first horizontal detected-position signal px1. The location in the first direction x of the point B is detected by the second hall element 23b, as the second horizontal detected-position signal px2. The location in the second direction y of the point C is detected by the third hall element 23c, as the first vertical detected-position signal py1. The location in the second direction y of the point D is detected by the fourth hall element 23d, as the second vertical detected-position signal py2.

As described above, the first and the second horizontal detected-position signals px1, px2 and the first and the second vertical detected-position signal py1, py2 are converted respectively to pdx1, pdx2, pdy1, pdy2, that are digital data. The data for the position P (pxx, pyy, pθ) are calculated with the equations below based on the data pdx1, pdx2, pdy1, pdy2, and the length d of the line segment AP, BP, CP, and DP. pxx=(pdx1+pdx2)÷2. pyy=(pdy1+pdy2)÷2. Pθ=cos$^{-1}${(pdx1−pdx2)/(2×d)}=cos$^{-1}${(pdy1−pdy2)/(2×d)}. The rotation angle pθ is an angle between the line segment AP and the first direction x or between the line segment CP and the second direction y (see FIG. 5).

Next, it is explained how to control the movement and rotation of the movable unit 20.

When the movable unit 20 is moved in the first direction x, the CPU 40 controls the values of the first and second horizontal PWM duties dx1, dx2 so that the directions and sizes of the first and second electromagnetic forces Pw1, Pw2 are the same.

When the movable unit 20 is moved in the second direction y, the CPU 40 controls the values of the first and second vertical PWM duties dy1, dy2 so that the directions and sizes of the third and fourth electromagnetic forces Pw3, Pw4 are the same.

When the movable unit 20 is rotated on the movable-plane without moving in either the first direction x or the second direction y, the CPU 40 performs the control of PWM duty according to one of three kinds of control patterns below. In the first pattern, the CPU 40 controls the values of the first and the second horizontal PWM duties dx1, dx2 so that the directions of the first and the second electromagnetic forces Pw1, Pw2 are opposite to each other and so that the sizes of the first and the second electromagnetic forces Pw1, Pw2 are the same. In the second pattern, the CPU 40 controls the values of the first and the second vertical PWM duties dy1, dy2 so that the directions of the third and fourth electromagnetic forces Pw3, Pw4 are opposite to each other and so that the sizes of the third and the fourth electromagnetic forces Pw3, Pw4 are the same. In the third pattern, the CPU 40 controls the values of the first and the second horizontal PWM duties dx1, dx2 and the first and the second vertical PWM duties dy1, dy2 so that the directions of the first and the second electromagnetic forces Pw1, Pw2 are opposite to each other, the directions of the third and the fourth electromagnetic forces Pw3, Pw4 are opposite to each other, the sizes of the first and the second electromagnetic forces Pw1, Pw2 are the same, and so that the sizes of the third and the fourth electromagnetic forces Pw3, Pw4 are the same.

The control pattern for the rotation of the movable unit 20 on movable-plane is decided from the above three patterns based on the third tilt-angle tθ detected by the position detector 55.

Figure 6:
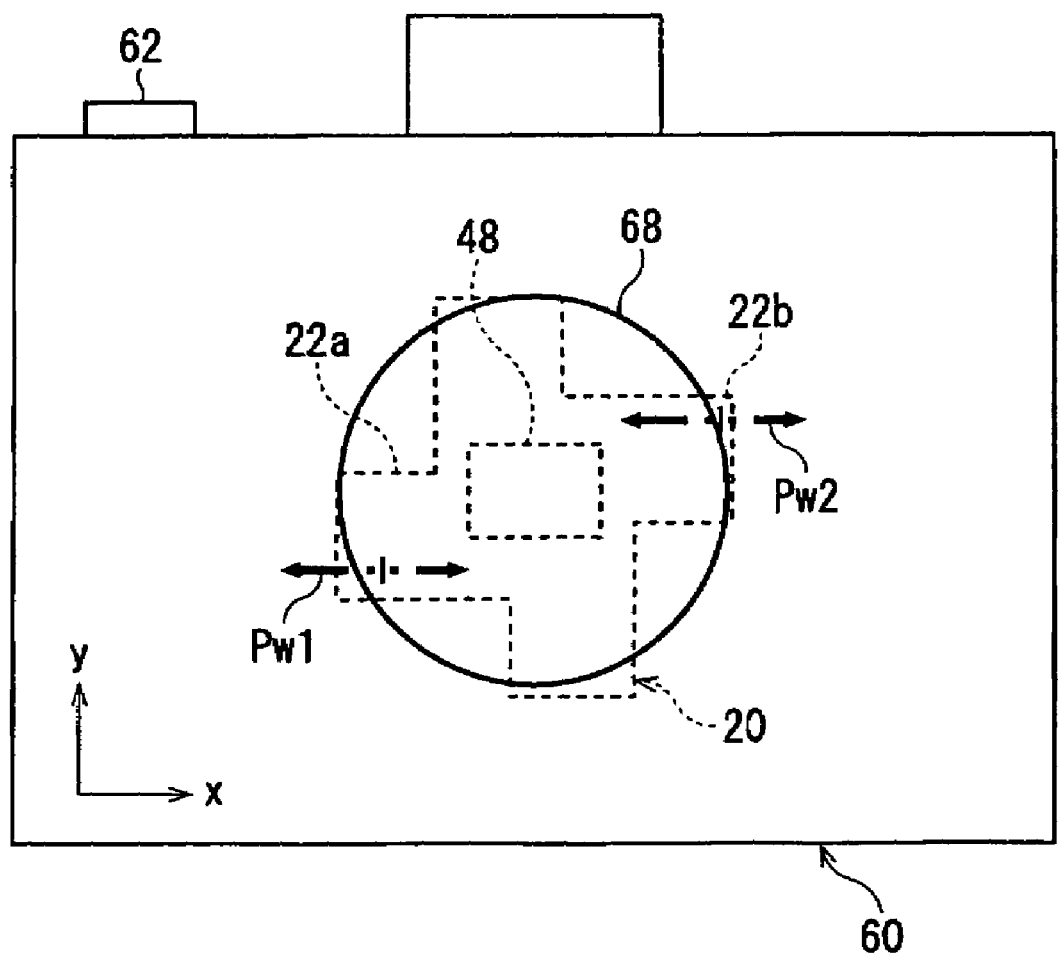
FIG. 6 is a perspective diagram of the camera for explaining the control of the movable unit in the first embodiment when the camera is in the horizontal position.

The position of the camera 60, whereby the first direction x is parallel to the ground and the second direction y is perpendicular to the ground, is defined as a horizontal position (see FIG. 6). The CPU 40 controls the first and the second horizontal PWM duties dx1, dx2 for the rotation of the movable unit 20 according to the above first control pattern, when the camera 60 is used in the horizontal position.

Figure 7:
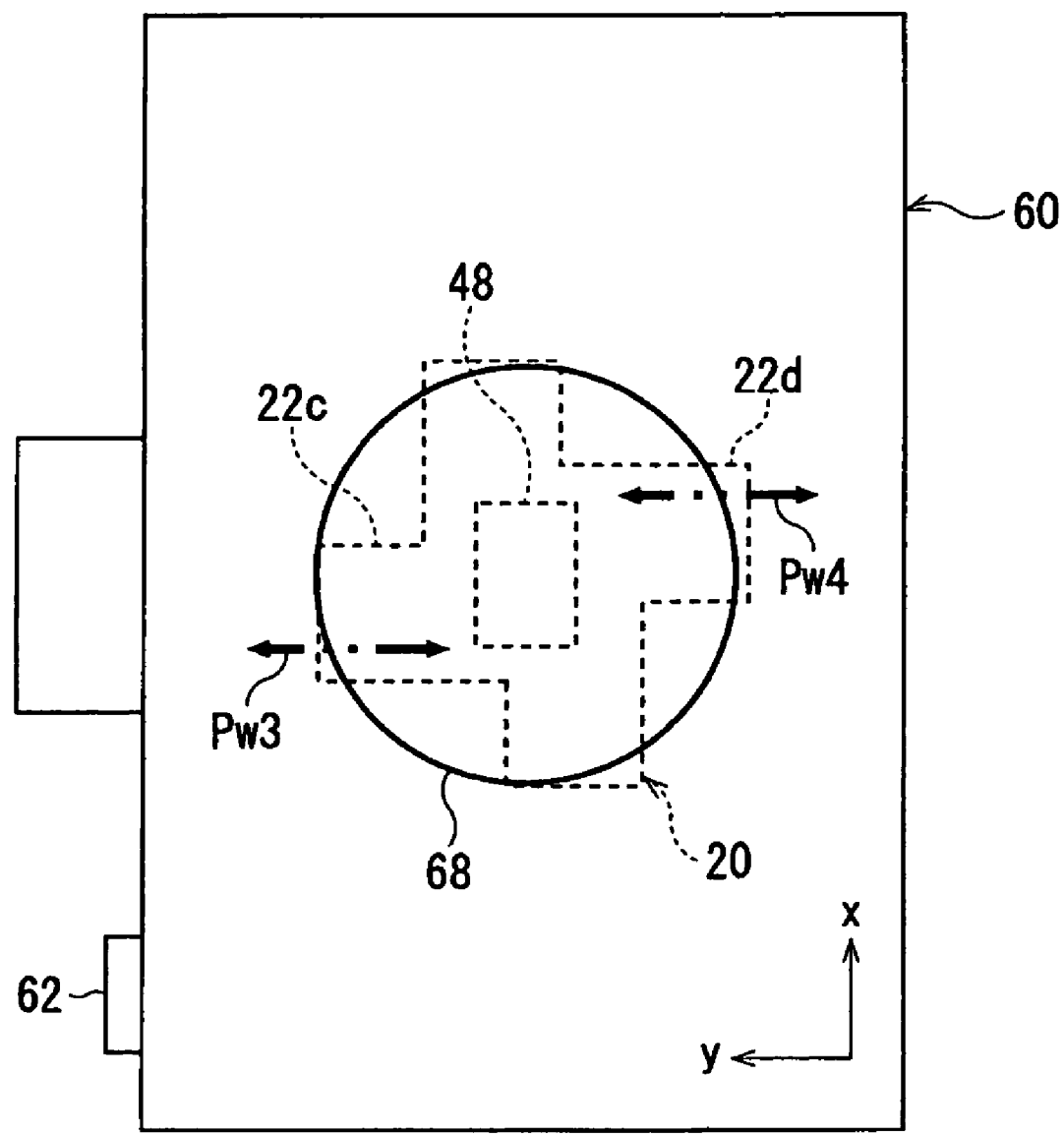
FIG. 7 is a perspective diagram of the camera for explaining the control of the movable unit in the first embodiment when the camera is in the vertical position.

The position of the camera 60, after it has been rotated around the optical axis LX by 90 degrees from the horizontal position, is defined as a vertical position (see FIG. 7). The CPU 40 controls the first and the second vertical PWM duties dy1, cy2 for the rotation of the movable unit 20, according to the above second control pattern, when is the camera 60 is used in the vertical position.

The control based on the third tilt-angle is explained in detail below by using FIGS. 8 to 12.

Figure 8:
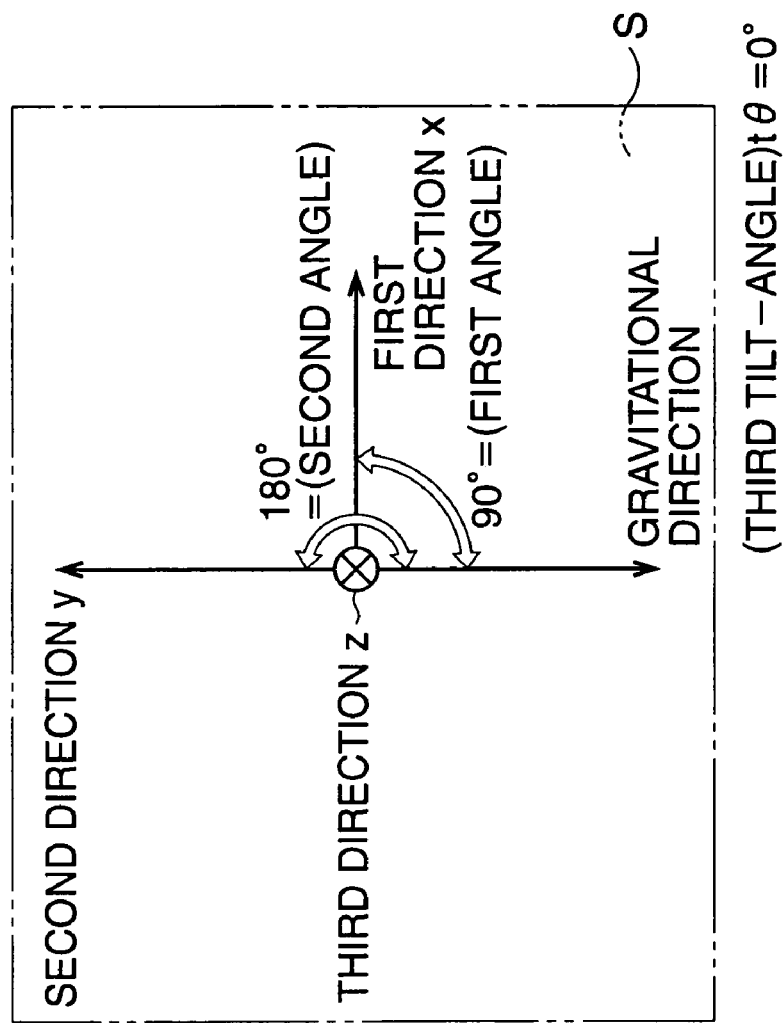
FIG. 8 illustrates the relationship between the first direction x, the second direction y, and the gravitational direction, to explain the change of the driving unit for the rotation according to the tilt of the camera.
Figure 9:
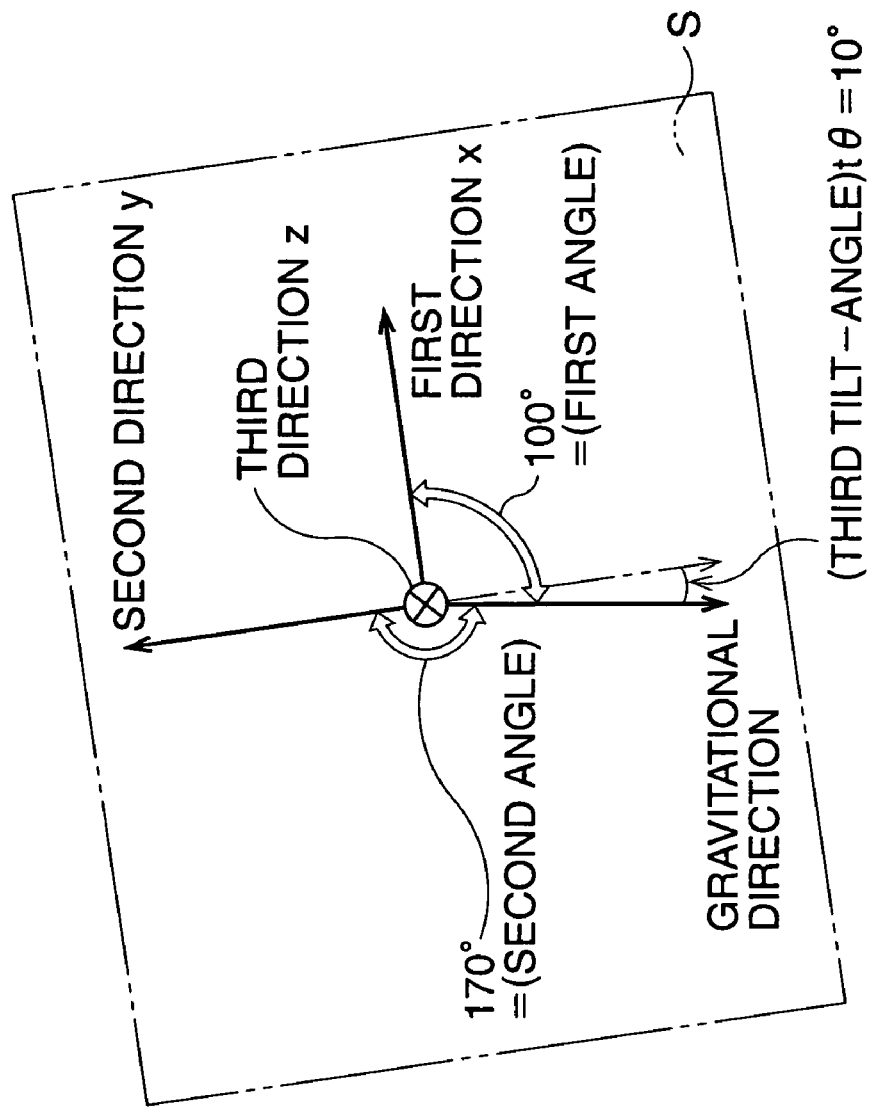
FIG. 9 illustrates the relationship between the first direction x, the second direction y, and the gravitational direction, to explain the change of the driving unit for the rotation according to the tilt of the camera.
Figure 10:
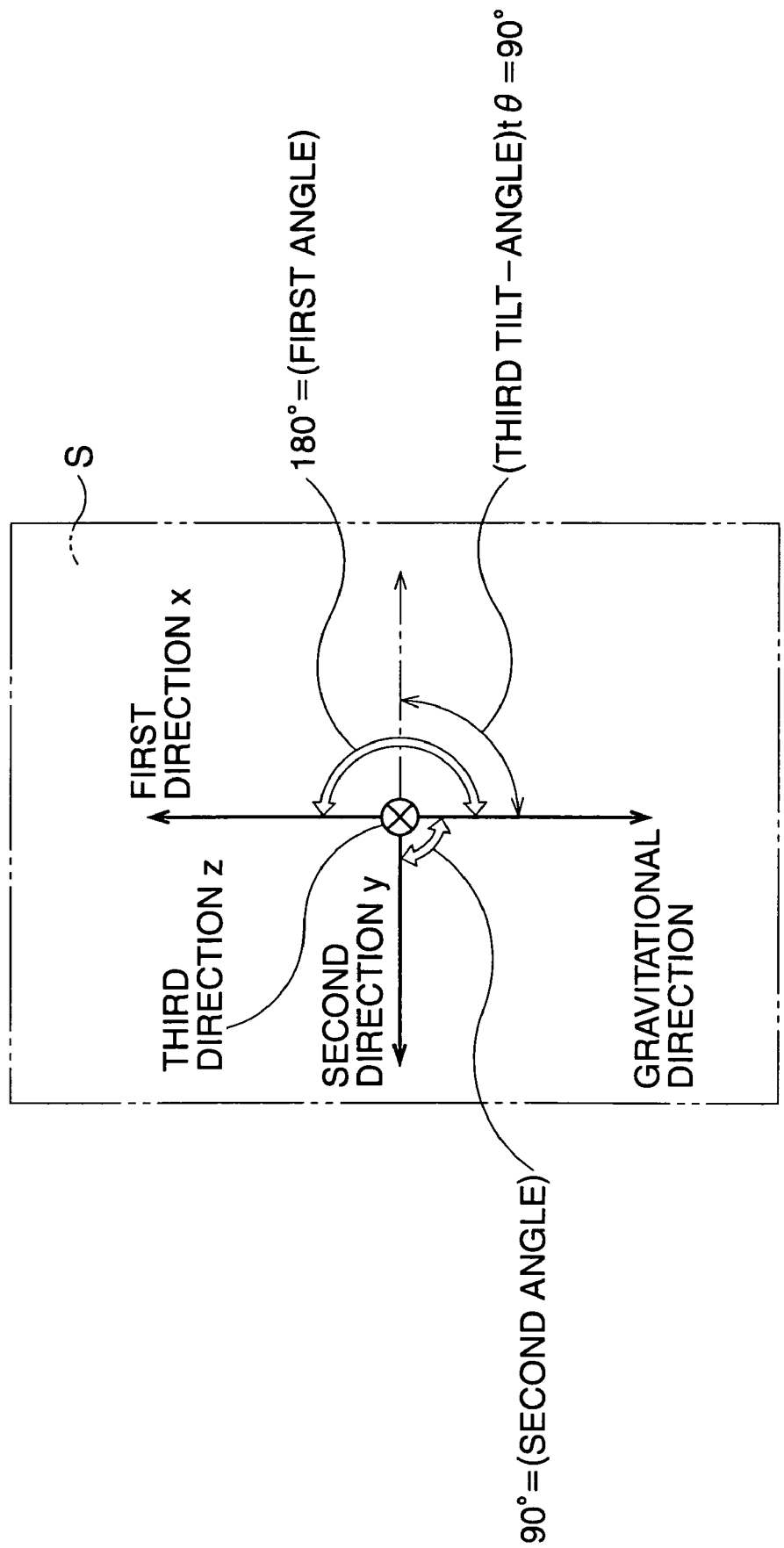
FIG. 10 illustrates the relationship between the first direction x, the second direction y, and the gravitational direction, to explain the change of the driving unit for the rotation according to the tilt of the camera.
Figure 12:
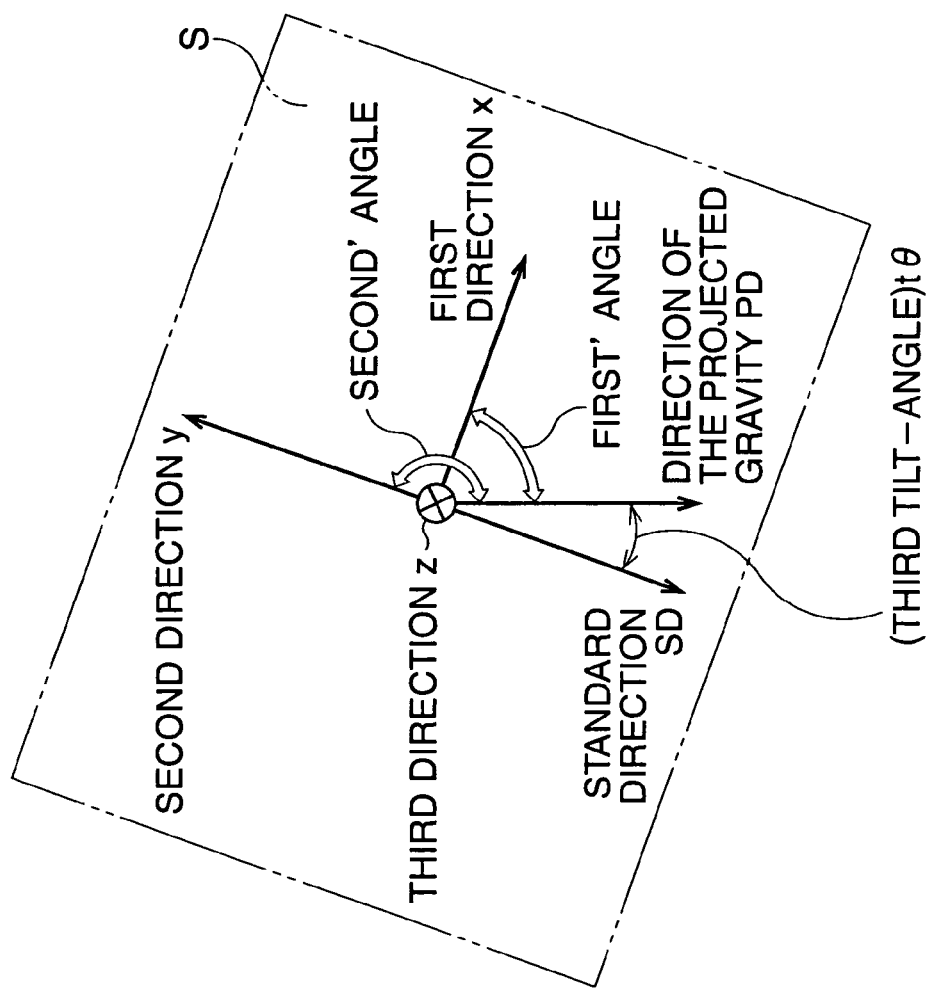
FIG. 12 illustrates the relation between the first direction, the second direction, the gravitational direction, and the standard direction of the projected gravity.
Figure 15:
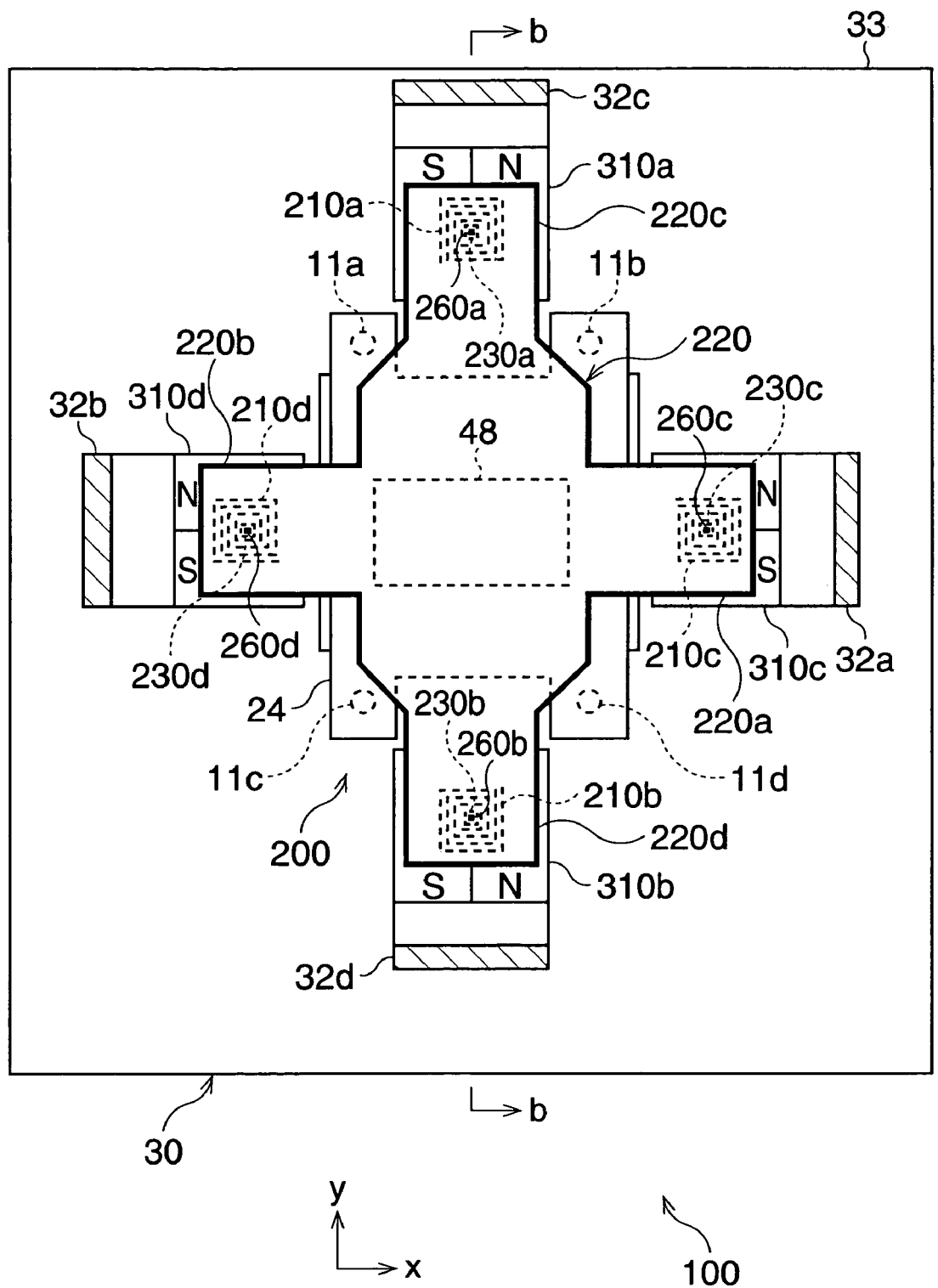
FIG. 15 is a front view of the imaging-device support part, that comprises the movable unit and the fixed unit, of the second embodiment.

FIGS. 8-10 show the relation of the third tilt-angle, the first direction x, the second direction y, and the gravitational direction, where the optical axis LX of the camera lens 68 is parallel to the ground or the gravitational direction is parallel to the movable-plane. FIGS. 11, 12 show the relation of the third tilt-angle, the first direction x, the second direction y, and the gravitational direction, where the camera 60 is rotated around the first direction x, or the optical axis LX of the camera lens 68 is not parallel to the ground.

An angle between the gravitational direction and the first direction x is defined as a first angle (0°<=first angle<=180°). A sin value of the first angle is defined as a first sin value. An angle between the gravitational direction and the second direction y is defined as a second angle (0°<=second angle<=180°). A sin value of the second angle is defined as a second sin value.

The first and the second angles are 90° and 180° and the first and the second sin values are 1 and 0 when the third tilt-angle is 0° (see FIG. 8). The first and the second angles are 100° and 170° and the first and the second sin values are approximately 0.98 and 0.17 when the third tilt-angle is 10° (see FIG. 9). The values of the first and the second horizontal PWM duties pdx1, pdx2 are controlled for the rotation of the movable unit 20 in the case where the first sin value is larger than the second sin value, such as the third tilt-angle tθ is 0° or 10°. The first sin value is larger than the second sin value when the third tilt-angle tθ is within the following ranges: −180°<tθ<−135°, −45°<tθ<45°, 135°<tθ<180°.

On the other hand, the first and the second angles are 180° and 0° and the first and the second sin values are 0 and 1 when the third tilt-angle is 90° (see FIG. 10). The values of the first and the second vertical PWM duties pdy1, pdy2 are controlled for the rotation of the movable unit 20 in the case where the second sin value is larger than the first sin value, when the third tilt-angle tθ is within the following ranges: −135°<tθ<−45°, 45°<tθ<135°.

The values of the first and the second horizontal PWM duties pdx1, pdx2 are controlled for the rotation of the movable unit 20 in the case where the first sin value is larger than the second sin value even if the optical axis LX of the camera lens 68 is not parallel to the ground (see FIG. 11). Similarly, the values of the first and the second vertical PWM duties pdy1, pdy2 are controlled for the rotation of the movable unit 20 in the case where the second sin value is larger than the first sin value even if the optical axis LX of the camera lens 68 is not parallel to the ground.

As explained below, it can be judged if the first sin value is larger than the second sin value based on the third tilt-angle even if the first angle and the second angle cannot be detected. Therefore, even if the position detector 55 of this embodiment cannot detect the first and the second angles, it can still be judged if the optical axis LX is not parallel to the ground.

A gravitational direction at the horizontal position is defined as a standard direction SD (see FIG. 12). The direction of the projected gravity is drawn as a PD in FIGS. 11 and 12. The standard direction SD is opposite to the second direction y, so an angle between the standard direction y and the direction of the projected gravity PD is the third tilt-angle tθ.

An angle between the direction of the projected gravity PD and the first direction x is defined as a first' angle (see FIG. 12). A sin value of the first' angle is defined as a first' sin value. An angle between the direction of the projected gravity PD and the second direction x is defined as a second' angle (see FIG. 12). A sin value of the second' angle is defined as a second' sin value. The first sin value is larger than the second sin value when the first' sin value is larger than the second' sin value. The second sin value is larger than the first sin value when the second' sin value is larger than the first' sin value.

Therefore, the first sin value is larger than the second sin value when the third tilt-angle tθ is within the following ranges: $-180°<t\theta<-135°$, $-45°<t\theta<45°$, $135°<t\theta<180°$. On the other hand, the second sin value is larger than the first sin value when the third tilt-angle tθ is within the following ranges: $-135°<t\theta<-45°$, $45°<t\theta<135°$.

An effect obtained by the above control is explained below with reference to FIGS. 13 and 14. In the below explanation, the camera 60 is positioned so that the third direction is parallel to the ground, and so that the third tilt-angle tθ is 0°. FIG. 13 shows a state where the driving force in the second direction y is used for the rotation of the movable unit 20. FIG. 14 shows a state where the driving force in the first direction x is used for the rotation of the movable unit 20.

The optical axis is shifted from the center of the imaging device 48 because of the gravity applied to the movable unit 20. A driving force in the opposite direction to the gravitational direction should be supplied to the movable unit 20 for canceling the influence of gravity even though the anti-shake operation is not working. Therefore, the first, the second, the third, and the fourth driving units should supply the movable unit 20 with a resultant force F including a force to cancel the influence of gravity, hereinafter referred to as Fk, a force for linear movement of the movable unit 20 in the anti-shake operation, hereinafter referred to as Fs, and a force for rotational movement of the movable unit 20 in the anti-shake operation, hereinafter referred to as Fr.

The gravitational direction is parallel to the second direction y when the third direction z is parallel to the ground and the third tilt-angle tθ is 0°. Therefore, the force Fk is output from the third and the fourth driving units that output the driving force in the second direction y.

It is difficult to accurately control the rotational movement of the movable unit 20 in proportion as an absolute value of a ratio of the force Fr to the resultant force F, |Fr/F|, is small. The absolute value of the ratio of the force Fr to the resultant force F, |Fr/F|, when a driving force for the rotation of the movable unit 20 is supplied by the first and the second driving units is explained with FIG. 13. The absolute value of the ratio of the force Fr to the resultant force F, |Fr/F|, when a driving force for the rotation of the movable unit 20 is supplied by the third and the fourth driving units, is explained with FIG. 14. In the below explanation, it is assumed that only the rotational movement is performed in the anti-shake operation.

The resultant force F is equal to the force Fr when the force Fr is supplied to the movable unit 20 by the first and second units. Therefore, the absolute value of the ratio of the force Fr to the resultant force F, |Fr/F|, is one (see FIG. 14). On the other hand, the resultant force F is the force Fk plus the force Fr. Therefore, the absolute value of the ratio of the force Fr to the resultant force F, |Fr/F| is |Fr/(Fk+Fr)| when the force Fr is supplied to the movable unit 20 by the third and the fourth units. Generally, the force Fk is larger than the force Fr. Therefore, the absolute value of the ratio is smaller than one (see FIG. 13).

It is preferable for an accurate rotation of the movable unit 20 that the absolute value of the ratio of the force Fr to the resultant force F, |Fr/F|, is large or the force Fk is small. Further, it is preferable for an accurate anti-shake operation that the force Fk is small. This is because the force component, that is left by the force Fk subtracted from the maximum driving forces of the first, the second, the third, and the fourth driving units, can be used for the anti-shake operation.

The force Fk is smaller when the first sin value is larger than the second sin value. The force Fk is smaller when the second sin value is larger than the first sin value. Accordingly, it is preferable for accurate rotation of the movable unit 20 that the first and second horizontal PWM duties px1, px2 are controlled for the rotation when the fist sin value is larger than the second sin value. Or, it is preferable for accurate rotation of the movable unit 20 that the first and second vertical PWM duties py1, py2 are controlled for the rotation when the second sin value is larger than the first sin value.

The third direction z is parallel to the ground in the above explanation, and in FIGS. 13 and 14. But, the effect obtained by the control in the first embodiment is the same even if the third direction z is not parallel to the ground.

Next, the second embodiment is explained. In the second embodiment, the arrangements of the first, the second, the third, and the fourth driving units and of the first, the second, the third, and the fourth hall elements are different from those of the first embodiment.

Figure 16:
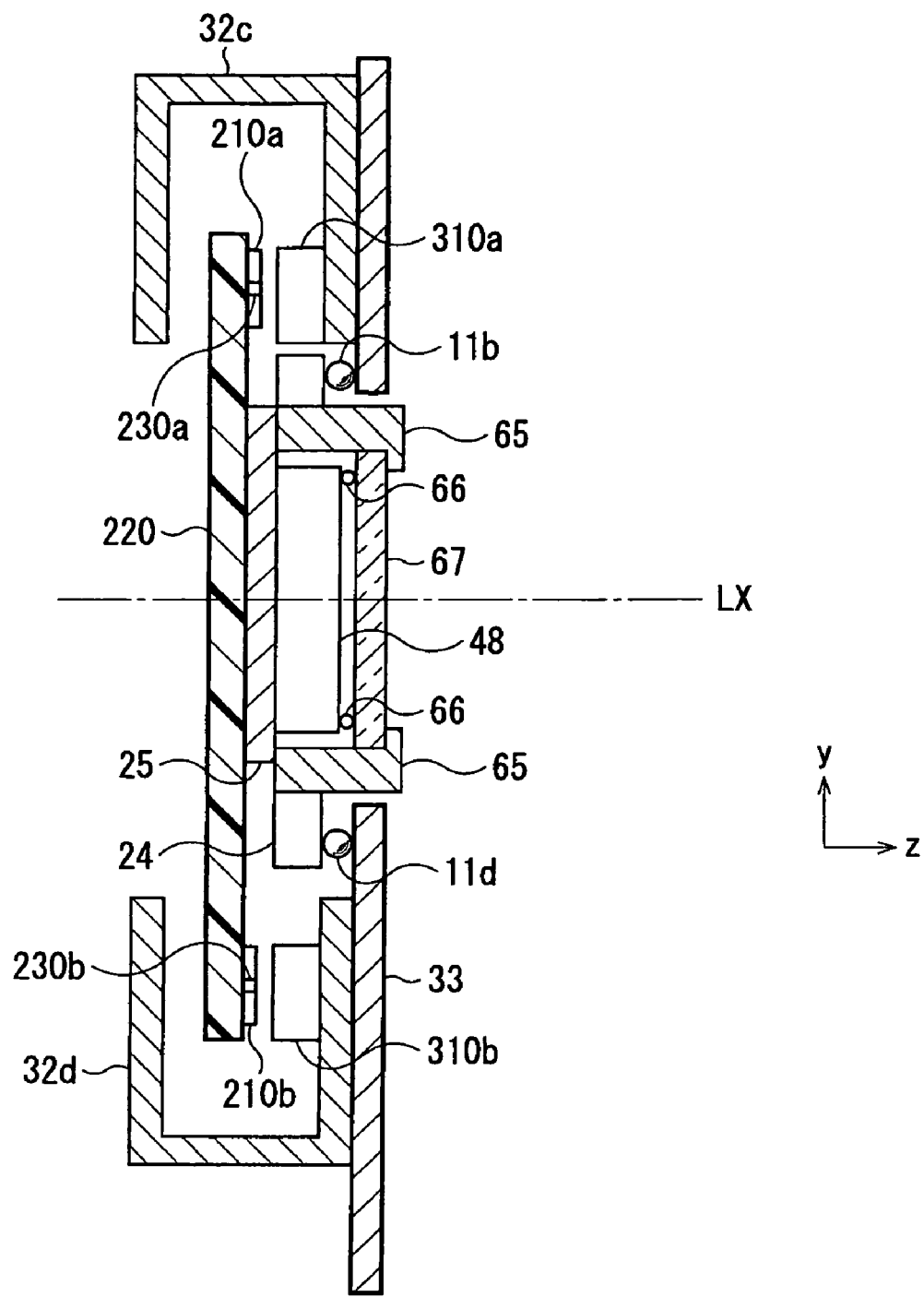
FIG. 16 illustrates a construction diagram of the section along line b-b of FIG. 15.
Figure 17:
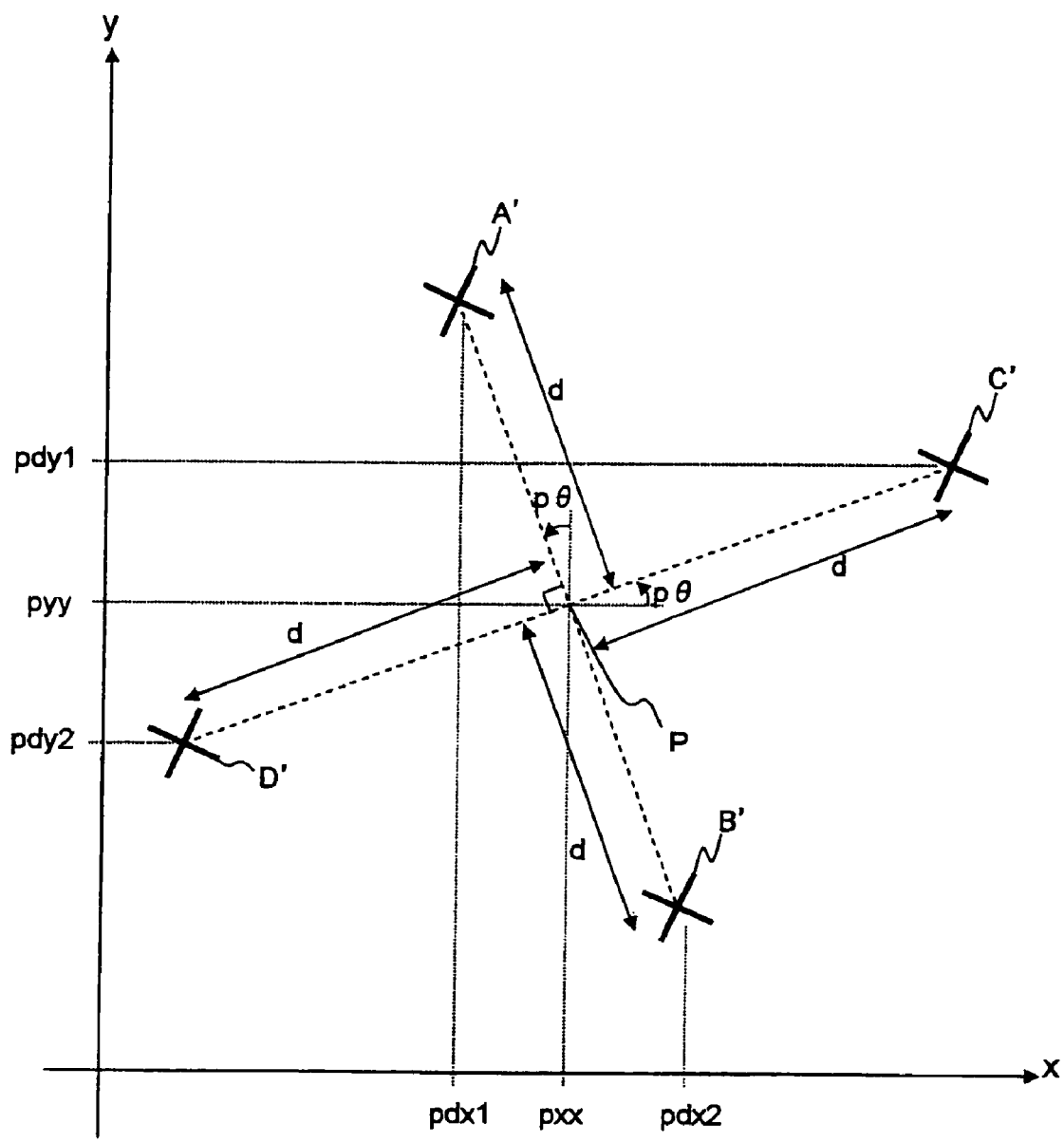
FIG. 17 is a diagram of a movable-plane for explaining how to calculate the position of P based on two locations in the first direction and two locations in the second direction.

Therefore, the second embodiment is explained mainly regarding the structures of the second embodiment that are different from those of the first embodiment by using FIGS. 15 to 19. FIG. 16 is a construction diagram of the section along line b-b of FIG. 15. In the second embodiment, the parts that have the same function as those of the first embodiment have the same sign.

The first driving unit, that makes the movable circuit board 220 move in the first direction x, is attached to the third side member 220c. In other words, the first coil 210a is attached to the third side member 220c, and the first magnet 310a is attached to the movable unit 200 side of the base board 33 through the third yoke 32c so that the first magnet 310a faces the first coil 210a and the first hall element 230a in the third direction z.

The second driving unit, that makes the movable circuit board 220 move in the first direction x, is attached to the fourth side member 220d. In other words, the second coil 210b is attached to the fourth side member 220d, and the second magnet 310b is attached to the movable unit 200 side of the base board 33 through the fourth yoke 32d so that the second magnet 310b faces the second coil 210b and the second hall element 230b in the third direction z.

The third driving unit, that makes the movable circuit board 220 move in the second direction y, is attached to the first side member 220a. In other words, the third coil 210c is attached to the first side member 220a, and the third magnet 310c is attached to the movable unit 200 side of the base board 33 through the first yoke 32a so that the third magnet 310c faces the third coil 210c and the third hall element 230c in the third direction z.

The fourth driving unit, that makes the movable circuit board 220 move in the second direction y, is attached to the second side member 220b. In other words, the fourth coil 210d is attached to the second side member 220b, and the fourth magnet 310d is attached to the movable unit 200 side of the base board 33 through the second yoke 32b so that the fourth magnet 310d faces the fourth coil 210d and the fourth hall element 230c in the third direction z.

The coil patterns of the first and the second coils 210a, 210b have line segments that are parallel to the second direction y before the movable unit 200 is rotated in a similar way to that in the first embodiment. The coil patterns of the third and the fourth coils 210c, 210d have line segments that are parallel to the first direction x before the movable unit 200 is rotated in a similar way to the first embodiment.

The coil pattern of the first coil 210a is formed so that the first driving point 260a is located at the center of the first coil 210a in a similar way to that in the first embodiment. The coil pattern of the second coil 210b is formed so that the second driving point 260b is located at the center of the second coil 210b in a similar way to that in the first embodiment. The coil pattern of the third coil 210c is formed so that the third driving point 260c is located at the center of the third coil 210c in a similar way to that in the first embodiment. The coil pattern of the fourth coil 210d is formed so that the fourth driving point 260d is located at the center of the fourth coil 210d in a similar way to that in the first embodiment.

The first and the second coils 210a, 210b are arranged on the movable circuit board 220 so that the intermediate point of the line segment connecting the first and the second driving points 260a, 260b agree with the center of the imaging device 48 and so that the line segment connecting the first and second driving points 260a, 260b is parallel to the second direction y in the initial situation before the movable unit 200 moves and rotates. Consequently, the line segment connecting the first and the second driving points 260a, 260b is perpendicular to the first direction x in the initial situation before the movable unit 200 moves and rotates.

The third and fourth coils 210c, 210d are arranged on the movable circuit board 220 so that the intermediate point of the line segment connecting the third and the fourth driving points 260c, 260d agrees with the center of the imaging device 48 and so that the line segment connecting the third and the fourth driving points 260c, 260d is parallel to the first direction x in the initial situation before the movable unit 200 moves and rotates. Consequently, the line segment connecting the third and the fourth driving points 260c, 260d is perpendicular to the second direction y in the initial situation before the movable unit 200 moves and rotates.

The first hall element 230a is arranged so that the first hall element 230a agrees with the first driving point 260a. The second hall element 230b is arranged so that the second hall element 230b agrees with the second driving point 260b. The third hall element 230c is arranged so that the third hall element 230c agrees with the third driving point 260c. The fourth hall element 230d is arranged so that the fourth hall element 230d agrees with the fourth driving point 260d.

The N pole and the S pole of the first and the second magnets 310a, 310b are arranged in the first direction x in a similar way to the first embodiment. The N pole and the S pole of the third and the fourth magnets 310c, 310d are arranged in the second direction y in a similar way to the first embodiment.

The arrangements of the first, the second, the third, and the fourth yoke are the same as those of the first embodiment.

The first hall element 230a detects the first horizontal detected-position signal px1. The second hall element 230b detects the second horizontal detected-position signal px2. The third hall element 230c detects the first vertical detected-position signal py1. The fourth hall element 230d detects the second vertical detected-position signal py2.

The above is explained in more detail below. The location in the first direction x of the point A' is detected by the first hall element 230a, as the first horizontal detected-position signal px1. The location in the first direction x of the point B' is detected by the second hall element 230b, as the second horizontal detected-position signal px2. The location in the second direction y of the point C' is detected by the third hall element 230c, as the first vertical detected-position signal py1. The location in the second direction y of the point D' is detected by the fourth hall element 230d, as the second vertical detected-position signal py2.

The first and the second horizontal detected-position signals px1, px2 are input to the CPU 40. The first and the second vertical detected-position signals py1 py2 are input to the CPU 40. The first and the second horizontal detected-position signals px1, px2 and the first and the second vertical detected-position signal py1, py2 are converted at the CPU 40 respectively to pdx1, pdx2, pdy1, pdy2, that are digital data.

The data for the position P (pxx, pyy, pθ) are calculated with the equations below based on the data pdx1, pdx2, pdy1, pdy2, and the length d of the line segment AP, BP, CP, and DP in a similar way to the first embodiment. pxx=(pdx1+pdx2)÷2. pyy=(pdy1+pdy2)÷2. Pθ=cos$^{-1}${(pdx1−pdx2)/(2×d)}=cos$^{-1}${(pdy1−pdy2)/(2×d)}.

The control of the movement and the rotation of the movable unit 200 is the same as that of the first embodiment.

When the movable unit 200 is moved in the first direction x, the CPU 40 controls the values of the first and the second horizontal PWM duties dx1, dx2 so that the directions and the sizes of the first and the second electromagnetic forces Pw1, Pw2 are the same.

When the movable unit 200 is moved in the second direction y, the CPU 40 controls the values of the first and the second vertical PWM duties dy1, dy2 so that the directions and the sizes of the third and the fourth electromagnetic forces Pw3, Pw4 are the same.

When the movable unit 200 is rotated on the movable-plane without moving in either the first direction x or the second direction y, the CPU 40 performs the control of PWM duty according to one of the three kinds of control patterns below. In the first pattern, the CPU 40 controls the values of the first and the second horizontal PWM duties dx1, dx2 so that the directions of the first and the second electromagnetic forces Pw1, Pw2 are opposite to each other and so that the sizes of the first and the second electromagnetic forces Pw1, Pw2 are the same. In the second pattern, the CPU 40 controls the values of the first and the second vertical PWM duties dy1, dy2 so that the directions of the third and the fourth electromagnetic forces Pw3, Pw4 are opposite to each other and so that the sizes of the third and the fourth electromagnetic forces Pw3, Pw4 are the same. In the third pattern, the CPU 40 controls the values of the first and the second horizontal PWM duties dx1, dx2 and the first and the second vertical PWM duties dy1, dy2 so that the directions of the first and the second electromagnetic forces Pw1, Pw2 are opposite to each other, the directions of the third and the fourth electromagnetic forces Pw3, Pw4 are opposite to each other, the sizes of the first and the second electromagnetic forces Pw1, Pw2 are the same, and so that the sizes of the third and the fourth electromagnetic forces Pw3, Pw4 are the same.

The control pattern for the rotation of the movable unit 200 on the movable-plane is decided from the above three patterns based on the third tilt-angle to detected by the position detector 55 in a similar way to the first embodiment.

Figure 18:
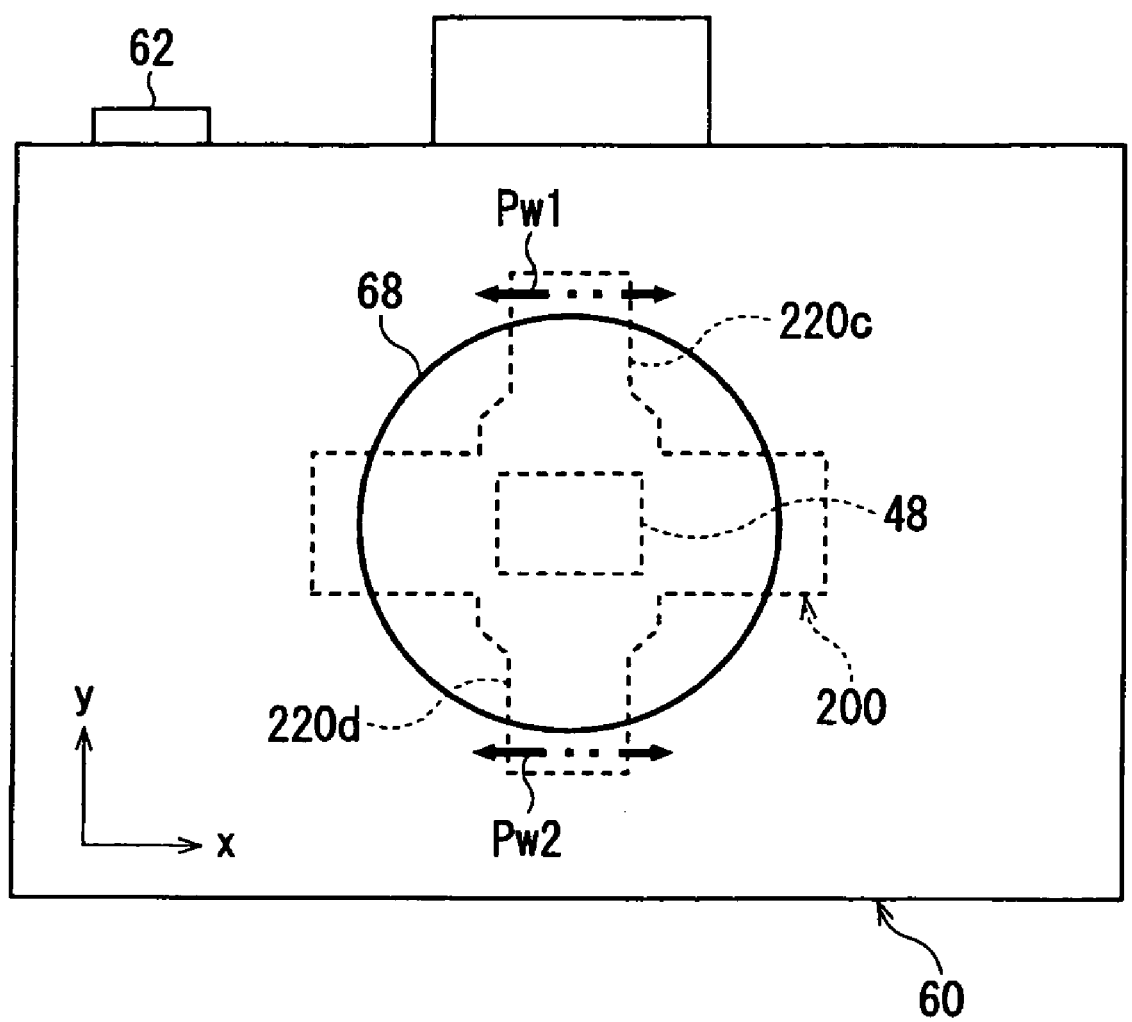
FIG. 18 is a perspective diagram of the camera for explaining the control of the movable unit in the second embodiment when the camera is in the horizontal position.

The CPU 40 controls the first and the second horizontal PWM duties dx1, dx2 for the rotation of the movable unit 200 according to the above first control pattern, when the camera 60 is operated in the horizontal position (see FIG. 18).

Figure 19:
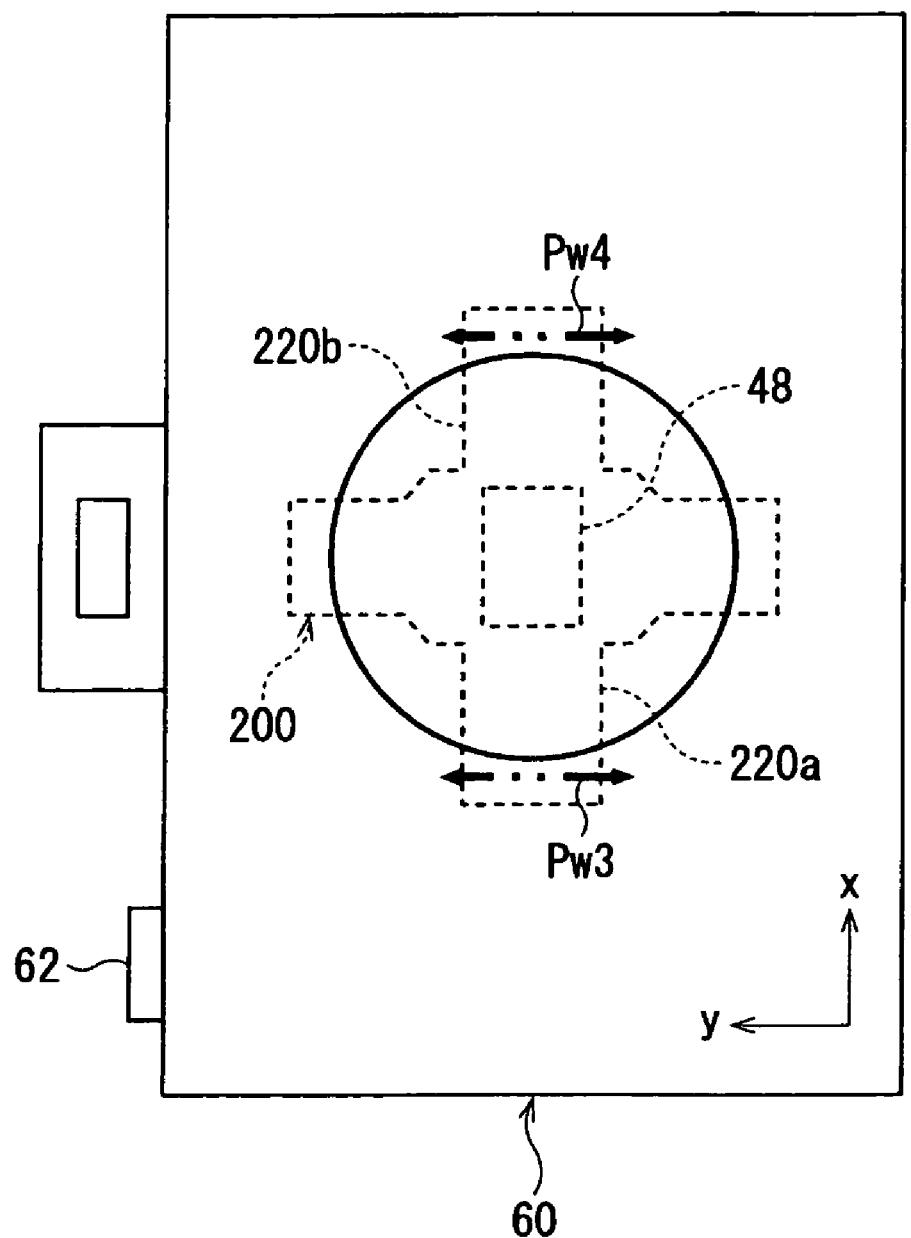
FIG. 19 is a perspective diagram of the camera for explaining the control of the movable unit in the second embodiment when the camera is in the vertical position.

The CPU 40 controls the first and the second vertical PWM duties dy1, dy2 for the rotation of the movable unit 200 according to the above second control pattern, when the camera 60 is operated in the vertical position (see FIG. 19).

The control of the first, the second, the third, and the fourth driving units based on the third tilt-angle in detail is the same as the first embodiment. The values of the first and the second horizontal PWM duties pdx1, pdx2 are controlled for the rotation of the movable unit 200 in the case where the third tilt-angle tθ is within the following ranges: $-180°<t\theta<-135°$, $-45°<t\theta<45°$, $135°<t\theta<180°$. The values of the first and the second vertical PWM duties pdy1, pdy2 are controlled for the rotation of the movable unit 200 in the case where the third tilt-angle tθ is within the following ranges: $-135°<t\theta<-45°$, $45°<t\theta<135°$.

In the first and the second embodiments, the CPU 40 controls the first and the second horizontal PWM duties dx1, dx2 for the rotation of the movable unit 20, 200 when the first sin value is larger than the second sin value and the CPU 40 controls the first and the second vertical PWM duties dy1, dy2 for the rotation of the movable unit 20, 200 when the second sin value is larger than the first sin value. However, the CPU 40 may control the first and the second horizontal PWM duties dx1, dx2 and the first and the second vertical PWM duties dy1, dy2 when the difference between the first and the second sin value is less than a predetermined threshold value. The force Fk has a force component in the first direction x and the second direction y when the camera 60 is tilted around the optical axis LX. Consequently, it is preferable that the first, the second, the third, and the fourth driving forces are used for the rotation of the movable unit 20, 200.

The position detector, that detects the direction of a projected gravity, is used in the first and the second embodiments. However, a position detector, that can directly detect the gravitational direction, can be used. The gravitational direction directly means the direction from which gravity acts on a material. Further in this embodiment, the gravitational direction means a direction where a material moves due to gravity. The direction, in which the movable unit can be moved by gravity, is the direction of the projected gravity because the movable unit 20 is supported so as to be movable on the movable-plane. Therefore, the direction of the projected gravity is included in the gravitational direction.

The driving units that supply the forces for the rotation of the movable unit 20, 200 are changed by judging which is larger the first sin value or the second sin value in the first and the second embodiments. However, the driving units that generate the force in the second direction y may make the movable unit 20, 200 rotate when the gravitational direction is parallel to the first direction x. And the driving units that generate the force in the first direction x may make the movable unit 20, 200 rotate when the gravitational direction is not parallel to the first direction x. Conversely, the driving units that generate the force in the first direction x may make the movable unit 20, 200 rotate when the gravitational direction is parallel to the second direction y. And the driving units that generate the force in the second direction y may make the movable unit 20, 200 rotate when the gravitational direction is not parallel to the second direction y.

A photo imaging is generally performed in the vertical or the horizontal position. Therefore, it is possible to accurately rotate the movable unit 20, 200 even if the control, for a selection of the driving units to supply the force for the rotation of the movable unit 20, 200, is as simple as the structure described above. Consequently, a more simple position detector can be used. For example, such a position detector would be one that can judge if a predetermined direction is horizontal to the gravitational direction or not.

The position detector is an acceleration sensor in the first and the second embodiments. However, the position detector may be one of a mercury switch, and a non-contacting switch with steel-ball.

The number of the points, where the movable unit 20, 200 receives the electromagnetic force, is 4 in the first and second embodiments. However, the number of points, where the movable unit 20, 200 receives the electromagnetic force, may be equal to or more than 3, under the following four conditions. One condition is that the number of points, where the movable unit 20, 200 receives the electromagnetic forces in the first direction x, is equal to or more than two. Another condition is that the line segment connecting the two of the points, where the movable unit 20, 200 receives the electromagnetic forces in the first direction x, is not parallel to the first direction x. In other words, the line segment intersects the first direction x. Another condition is the number of points, where the movable unit 20, 200 receives the electromagnetic forces in the second direction y, is equal to or more than two. The other condition is that the line segment connecting the two of the points, where the movable unit 20, 200 receives the electromagnetic forces in the second direction y, is not parallel to the second direction y. In other words, the line segment intersects the second direction y.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-277362 (filed on Sep. 24, 2004), which is expressly incorporated herein, by reference, in its entirety.

The invention claimed is:

1. An anti-shake apparatus, comprising:
   a movable unit;
   a fixed unit that supports said movable unit when said movable unit is moved in first and second directions, that are different from each other, and when said movable unit is rotated on a movable-plane that is parallel both to said first and said second directions;
   a first driving unit that supplies a first driving force in said first direction to said movable unit and that is attached to one of said movable unit and said fixed unit;
   a second driving unit that supplies a second driving force in said first direction to said movable unit and that is attached to one of said movable unit and said fixed unit:
   a third driving unit that supplies a third driving force in said second direction to said movable unit and that is attached to one of said movable unit and said fixed unit:
   a fourth driving unit that supplies a fourth driving force in said second direction to said movable unit and that is attached to one of said movable unit and said fixed unit:
   a first detector that detects a gravitational direction acting on said movable unit;
   a second detector that detects a rotational movement around a straight line perpendicular to said movable-plane; and
   a control unit that controls said first, said second, said third, and said fourth driving forces; and
   when said gravitational direction is parallel to said first direction, said controller controls said third and said fourth driving forces so as to correct said rotational movement; and when said gravitational direction is parallel to said second direction, said controller controls said first and said second driving forces so as to correct said rotational movement.

2. An anti-shake apparatus according to claim 1, wherein when a first sin value of an angle between said first direction and said gravitational direction is larger than a second sin value of an angle between said second direction and said gravitational direction, said controller controls said first and said second driving forces to correct said rotational movement detected by said second detector, and when said second sin value is larger than said first sin value, said controller controls said third and said fourth driving forces to correct said rotational movement detected by said second detector.

3. An anti-shake apparatus according to claim 2, wherein said controller controls said first, said second, said third, and said fourth forces to correct said rotational movement detected by said second detector when a differential between said first and said second sin values is smaller than a first predetermined threshold value.

4. An anti-shake apparatus according to claim 1, wherein said first driving unit outputs said first driving force at a first driving point on said movable unit, said second driving unit outputs said second driving force at a second driving point on said movable unit, said third driving unit outputs said third driving force at a third driving point on said movable unit, said fourth driving unit outputs said fourth driving force at a fourth driving point on said movable unit, a first line segment connecting said first and said second driving points is not parallel to said first direction, and a second line segment connecting said third and said fourth driving points is not parallel to said second direction.

5. An anti-shake apparatus according to claim 4, wherein said first line segment is perpendicular to said first direction, and said second line segment is perpendicular to said second direction.

6. An anti-shake apparatus according to claim 1, wherein a camera comprises said anti-shake apparatus, said movable-plane is perpendicular to an optical axis of a camera lens of said camera.

7. An anti-shake apparatus according to claim 1, wherein one of an imaging device and a hand-shake correcting lens is attached to said movable unit.

8. An anti-shake apparatus according to claim 1, wherein said first direction is perpendicular to said second direction.

9. An anti-shake apparatus according to claim 1, wherein said first detector is one of an acceleration sensor, a mercury switch, and a non-contacting switch with steel-ball.

* * * * *